(12) United States Patent
Kim et al.

(10) Patent No.: US 8,524,796 B2
(45) Date of Patent: *Sep. 3, 2013

(54) ACTIVE POLYMER COMPOSITIONS

(75) Inventors: Young-Sam Kim, Midland, MI (US);
Leonardo C. Lopez, Midland, MI (US);
Scott T. Matteucci, Midland, MI (US);
Steven R. Lakso, Sanford, MI (US)

(73) Assignee: Dow Global Technologies LLC

( * ) Notice: Subject to any disclaimer, the term of this patent is extended or adjusted under 35 U.S.C. 154(b) by 457 days.

This patent is subject to a terminal disclaimer.

(21) Appl. No.: 12/539,793

(22) Filed: Aug. 12, 2009

(65) Prior Publication Data
US 2010/0041292 A1 Feb. 18, 2010

Related U.S. Application Data

(60) Provisional application No. 61/088,537, filed on Aug. 13, 2008.

(51) Int. Cl.
*A61L 9/04* (2006.01)
*C08L 77/00* (2006.01)
*C08G 69/00* (2006.01)

(52) U.S. Cl.
USPC ........... 523/102; 523/105; 523/122; 524/602; 528/291; 106/15.05

(58) Field of Classification Search
USPC ......... 523/102, 105, 122; 524/602; 528/291; 106/15.05
See application file for complete search history.

(56) References Cited

U.S. PATENT DOCUMENTS

| | | | |
|---|---|---|---|
| 6,034,163 A | 3/2000 | Barbee et al. | |
| 6,172,167 B1 | 1/2001 | Stapert et al. | |
| 6,821,479 B1 | 11/2004 | Smith et al. | |
| 6,833,104 B2 | 12/2004 | Berger | |
| 6,852,410 B2 | 2/2005 | Veedu et al. | |
| 6,897,349 B2 | 5/2005 | Gibbins et al. | |
| 6,967,261 B1 | 11/2005 | Soerens et al. | |
| 7,235,295 B2 | 6/2007 | Laurencin et al. | |
| 8,268,042 B2 * | 9/2012 | Lopez et al. | 95/52 |
| 8,343,257 B2 * | 1/2013 | Matteucci et al. | 95/45 |
| 2004/0180201 A1 | 9/2004 | Veedu et al. | |
| 2005/0100501 A1 | 5/2005 | Veedu et al. | |
| 2005/0170192 A1 | 8/2005 | Kambe et al. | |
| 2006/0034907 A1 | 2/2006 | Nagaike et al. | |
| 2008/0008739 A1 * | 1/2008 | Hossainy et al. | 424/426 |
| 2008/0091233 A1 | 4/2008 | Ellis-Behnke et al. | |
| 2008/0214743 A1 | 9/2008 | Broos et al. | |
| 2010/0041857 A1 | 2/2010 | Harris et al. | |
| 2010/0179284 A1 * | 7/2010 | Ward et al. | 525/54.2 |
| 2010/0200494 A1 * | 8/2010 | Storer et al. | 210/510.1 |

FOREIGN PATENT DOCUMENTS

| | | |
|---|---|---|
| EP | 0376323 | 7/1990 |
| WO | 0042105 | 7/2000 |
| WO | 03028039 | 4/2003 |
| WO | 2006096791 | 9/2006 |
| WO | 2007024125 | 3/2007 |
| WO | 2007030791 | 3/2007 |
| WO | 2007078568 | 7/2007 |
| WO | 2007099397 | 9/2007 |
| WO | 2007121458 | 10/2007 |
| WO | 2008101051 | 8/2008 |
| WO | 2008112833 | 9/2008 |
| WO | 2008150970 | 12/2008 |
| WO | 2009134824 | 11/2009 |

OTHER PUBLICATIONS

Ciferri, Alberto, "Supramolecular Polymers", Second Edition, 2005, pp. 157-158, CRC Press.
Corbin et al., "Chapter 6 Hydrogen-Bonded Supramolecular Polymers: Linear and Network Polymers and Self-Assembling Discotic Polymers", Supramolecular Polymers, 2nd edition, CRC Press, 2005, pp. 153-185.
Duan et al., "Preparation of Antimicrobial Poly (e-caprolactone) Electrospun Nanofibers Containing Silver-Loaded Zirconium Phosphate Nanoparticles", Journal of Applied Polymer Sciences, 2007, vol. 106, pp. 1208-1214, Wiley Periodicals, Inc.
Hagewood, "Potential of Polymeric Nanofibers for Nonwovens and Medical Applications", Fiberjournal.com, Feb. 26, 2008, 4 Pages, J.Hagewood, LLC and Ben Shuler, Hills, Inc.
Khil et al., "Electrospun Nanofibrous Polyurethane Membrane as Wound Dressing", Wiley Periodicals, Inc., 2003, pp. 675-679.
Koevoets et al., "Molecular Recognition in a Thermoplastic Elastomer", Journal of the American Chemical Society, 2005, pp. 2999-3003, vol. 127.
Krook et al., "Barrier and mechanical properties of injection molded montmorillonite/polyesteramide nanocomposites", Polymer Engineering and Science, 2005, pp. 135-141, vol. 45 No. 1.
Lips et al., "Incorporation of different crystallizable amide blocks in segmented poly(ester amide)s", Polymer, 2005, pp. 7834-7842, vol. 46, Elsevier Ltd.
Lips et al., "Synthesis and characterization of poly(ester amide)s containing crystallizable amide segments", Polymer, 2005, pp. 7823-7833, vol. 46, Elsevier Ltd.
Liu et al., "The preparation and properties of biodegradable polyesteramide composites reinforced with nano-CaCO3 and nano-SiO2", Materials Letters, 2007, pp. 4216-4221, vol. 61, Elsevier Ltd.
Zou et al., "Stabilization and mechanical properties of biodegradable aliphatic polyesteramide and its filled composites", Polymer Degradation and Stability, 2004, pp. 87-92, vol. 83, Elsevier Ltd.

* cited by examiner

*Primary Examiner* — Tae H Yoon

(57) ABSTRACT

The instant invention generally provides an activated polymer composition containing an active agent (i.e., a chemically- or biologically-active agent), an activated fiber comprising the activated polymer composition, an activated-fiber composite comprising the activated fiber and a fiberweb support, processes of fabricating the activated fiber and activated-fiber composition, and an article comprising the activated polymer composition. The instant invention also generally provides a highly filled polymer filler composite comprising a molecularly self-assembling (MSA) material and a mineral filler or conductive filler dispersed in the MSA material, and a process of making and article comprising the highly filled polymer filler composite.

8 Claims, 8 Drawing Sheets

ACTIVE POLYMER COMPOSITIONS

CROSS-REFERENCE TO RELATED APPLICATION(S)

This application claims benefit of priority from U.S. Provisional Patent Application No. 61/088,537, filed Aug. 13, 2008, which application is incorporated by reference herein in its entirety.

The present invention is in the field of polymer compositions and fibers comprising the polymer compositions.

BACKGROUND OF THE INVENTION

U.S. Pat. No. 6,852,410 B2 and its divisional USPAPN US 2005/0100501 A1 mention single-wall carbon nanotube (SWNT)-PAN composites and SWNT-PAN composite fibers fabricated therefrom.

There is a need in the polymer art for polymer compositions containing chemically- and biologically-active agents, fibers comprising the polymer compositions, processes of fabricating such fibers, and articles comprising such polymer compositions and fibers.

SUMMARY OF THE INVENTION

The instant invention generally provides an activated polymer composition comprising a molecularly self-assembling material and an active agent (i.e., a chemically- or biologically-active agent), an activated fiber comprising the activated polymer composition, an activated-fiber composition comprising the activated fiber and a fiberweb support, processes of fabricating the activated fiber and activated-fiber composition, and an article comprising the activated polymer composition.

In a first embodiment, the instant invention is an activated polymer composition comprising a molecularly self-assembling (MSA) material and one or more active agents, wherein each active agent independently comprises odor control material, polyelectrolyte, chelating agent, microspheres, non-peptidic antimicrobial substance, an anti-clotting compound, a clotting compound, or a wound healing promoter. Preferably, the one or more active agents comprise a total of from 0.0001 weight percent (wt %) to 75 wt %, and more preferably from 0.01 wt % to 50 wt %, of the activated polymer composition based on total weight of the activated polymer composition. The one or more active agents are in operative contact with a surface of the MSA material (e.g., the MSA material has a surface and the active agent(s) are in coating operative contact with the surface of the MSA material), are dispersed within the MSA material, or both.

In a second embodiment, the activated polymer composition of the first embodiment comprises an activated fiber. Accordingly, instant invention also is an activated fiber comprising a fiber of a molecularly self-assembling (MSA) material and one or more active agents, wherein the active agents are as described in the first embodiment. Preferably, the activated fiber comprises a woven or, more preferably, nonwoven web.

In a third embodiment, the instant invention is an activated-fiber composite comprising an activated fiber of the second embodiment and a fiberweb support, wherein the fiberweb support is in supporting operative contact with the activated fiber of the second embodiment. In some embodiments, the fiberweb support is porous.

In a fourth embodiment, the instant invention is a process for fabricating the activated fiber of the second embodiment, the process comprising the steps of: elongating under fiber-forming conditions either a melt comprising the MSA material or a solution comprising a solvent and the MSA material; and contacting one or more active agents to the MSA material to produce one or more activated fibers of the second embodiment.

In a fifth embodiment, the instant invention is a process of making the activated-fiber composite of the third embodiment, the process comprising the steps of: elongating under fiber-forming conditions either a melt comprising the MSA material or a solution comprising a solvent and the MSA material; contacting one or more active agents to the MSA material to produce one or more activated fibers of the second embodiment; and operatively contacting the one or more activated fibers to a fiberweb support to make the activated-fiber composite of the third embodiment.

In a sixth embodiment, the instant invention is an article comprising the activated polymer composition of the first embodiment. Preferably, the activated polymer composition comprises the activated fiber or activated-fiber composite of the second or third embodiments, respectively. Preferably, the article comprises a bandage, medical gown, medical scaffold, cosmetic, sound insulation, barrier material, diaper coverstock, adult incontinence pants, training pants, underpad, feminine hygiene pad, wiping cloth, porous filter medium (e.g., for filtering air, gasses, or liquids), durable paper, fabric softener, home furnishing, floor covering backing, geotextile, apparel, apparel interfacing, apparel lining, shoe, industrial garment, protective garments and fabrics, agricultural fabric, automotive fabric, coating substrate, laminating substrate, leather, or electronic component.

In a seventh embodiment, the article of the sixth embodiment comprises an activated woven or co-woven fabric. Accordingly, the instant invention also comprises a woven fabric comprising one or more activated fibers (e.g., activated filament(s)) of the second embodiment. The woven fabric is prepared by a process comprising a step of weaving an MSA fiber (e.g., MSA filament) useful in the second embodiment or the activated fiber of the second embodiment to provide the woven fabric. The active agent is contacted to the MSA fiber useful in the second embodiment during or after the weaving step employing the same.

In an eighth embodiment, the instant invention is a highly filled polymer filler composite comprising a molecularly self-assembling (MSA) material and a mineral filler or conductive filler dispersed in the MSA material, wherein the mineral filler comprises a finely divided metal, metal carbonate, metal oxide, silica, or talc; the conductive filler comprises an activated carbon, carbon black, carbon nanotube (e.g., single wall and multiwall), or fullerene and the conductive filler is in the form of a particle having an average size of 30 micrometers or smaller; the mineral filler or conductive filler comprising from 76 weight percent (wt %) to 90 wt % of the highly filled polymer filler composite based on total weight of the highly filled polymer filler composite. Preferably, the mineral filler or conductive filler comprises 85 wt % or less, or 80 wt % or more of the highly filled polymer filler composite. Also preferably, the mineral filler is in the form of a particle having an average size of 1.0 micrometer or larger or a fiber having an average diameter of 1.0 micrometer or larger.

In a ninth embodiment, the instant invention is a process for making the highly filled polymer filler composite of the eighth embodiment, the process comprising the step of: dispersing a highly filling amount of the mineral filler or conductive filler in either a melt comprising the MSA material or a solution comprising a solvent and the MSA material to produce the highly filled polymer filler composite of the eighth embodiment. Preferably the process employs the melt comprising the MSA material.

In a tenth embodiment, the instant invention is an article comprising the highly filled polymer filler composite of the eighth embodiment. Preferably, the highly filled polymer filler composite of the eighth embodiment is extruded, molded, blow molded, or cast to form the article.

The highly filled polymer filler composite of the eighth embodiment is melt processable even at high filler concentrations (e.g., greater than or equal to 50 wt % filler).

The instant invention also comprises a co-woven fabric comprising one or more non-MSA fibers and one or more activated fibers of the second embodiment, the one or more activated fibers and the one or more non-MSA fibers being co-woven to provide the co-woven fabric. Preferred non-MSA fibers are fibers comprising cotton, silk, rayon, wool, olefinic fibers, nylon, polyester, other textile fibers, and combinations thereof. The co-woven fabric is prepared by a process comprising a step of co-weaving the non-MSA fiber(s) with either the MSA fiber (e.g., MSA filament) useful in the second embodiment or the activated fiber of the second embodiment to provide the co-woven fabric. The active agent is contacted to the MSA fiber (e.g., MSA filament) useful in the second embodiment during or after the co-weaving step employing the same.

Additional embodiments of the present invention are illustrated in the accompanying drawings and are described in the following detailed description and claims.

DETAILED DESCRIPTION OF THE INVENTION

Figure 1:
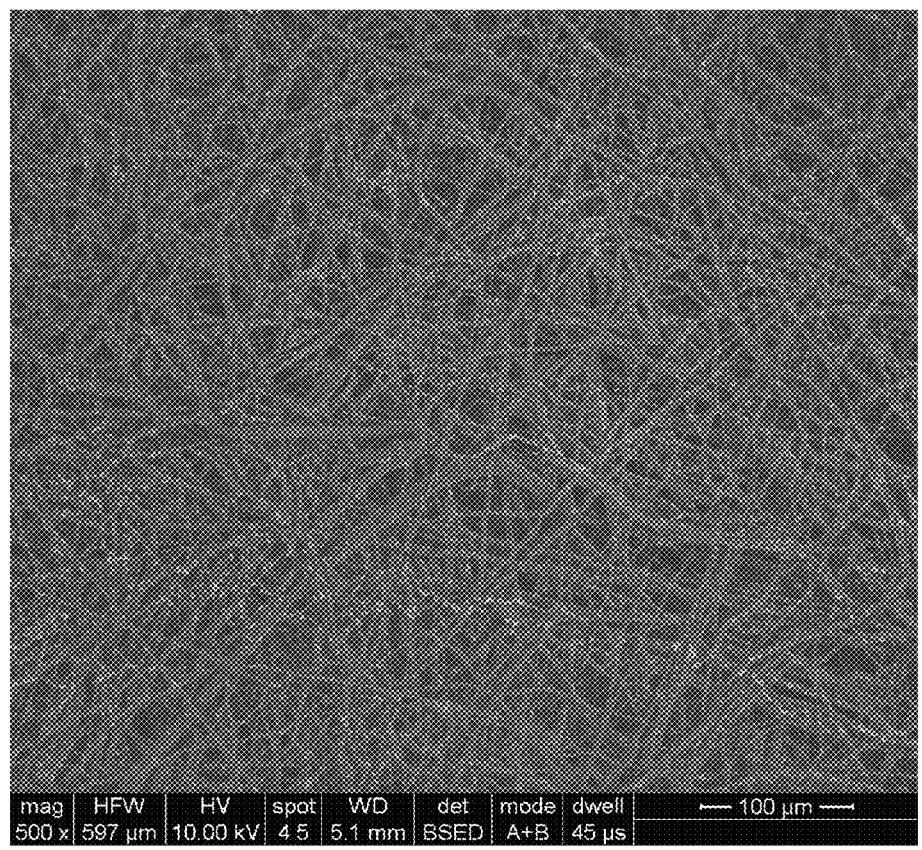
FIG. 1 is a scanning electron microscope (SEM) image of the in situ silver chloride-treated nonwoven web comprising MSA fibers of Example 3 at 500× magnification.

The instant invention generally provides an activated polymer composition containing an active agent (i.e., a chemically- or biologically-active agent), an activated fiber comprising the activated polymer composition, an activated-fiber composite comprising the activated fiber and a fiberweb support, processes of fabricating the activated fiber and activated-fiber composite, and an article comprising the activated polymer composition. In any embodiment of the instant invention described herein, the open-ended terms "comprising," "comprises," and the like (which are synonymous with "including," "having," and "characterized by") may be replaced by the respective partially closed phrases "consisting essentially of," consists essentially of," and the like or the respective closed phrases "consisting of," "consists of," and the like.

For purposes of United States patent practice and other patent practices allowing incorporation of subject matter by reference, and the entire contents—unless otherwise indicated—of each U.S. patent, U.S. patent application, U.S. patent application publication, PCT international patent application and WO publication equivalent thereof, referenced in the instant Detailed Description of the Invention are hereby incorporated by reference, especially with respect to the disclosure of synthetic techniques, reaction conditions, and compounds. When available, a U.S. patent or U.S. patent application publication family member thereof may be incorporated by reference instead of the PCT international patent application or WO publication equivalent. In an event where there is a conflict between what is written in the present specification and what is written in a patent, patent application, or patent application publication, or a portion thereof that is incorporated by reference, what is written in the present specification controls.

In the present application, any lower limit of a range, or any preferred lower limit of the range, may be combined with any upper limit of the range, or any preferred upper limit of the range, to define a preferred embodiment of the range.

In an event where there is a conflict between a value given in a U.S. unit (e.g., inches) and a value given in a standard international unit (e.g., centimeters), the U.S. unit value controls.

In the present application, when referring to a preceding list of elements (e.g., ingredients), the phrases "mixture thereof," "combination thereof," and the like mean any two or more of the listed elements.

Definitions

As used herein, the term "active agent" means an efficacious substance that is capable of chemical or biological function, or both. The efficacious substance is not a MSA material. In some embodiments, the efficacious substance is capable of one such function or more than one such function.

The term "activated fiber" means the activated fiber of the second embodiment of the present invention and preferred embodiments thereof except as otherwise noted.

The term "activated-fiber composite" means the activated-fiber composite of the third embodiment of the present invention and preferred embodiments thereof except as otherwise noted.

The term "activated polymer composition" means the activated polymer composition of the first embodiment of the present invention and preferred embodiments thereof except as otherwise noted.

The term "anti-clotting compound" means an antithrombotic substance. Preferred antithrombotic substances are anticoagulants, antiplatelets, and thrombolytic drugs. More preferred antithrombotic substances are vitamin K antagonists, aspirin, clopidogrel, dipyrimadole, propanolol, sulfinpyrazone, ticlopidine, warfarin, and heparin.

The term "antimicrobial substance" means an antibiotic, antiviral, antiparasitic, antiamoebic, or antifungal material, preferably an antibiotic, antiviral, antiparasitic, antiprotozoal, or antifungal compound. Preferred non-peptidic antimicrobial substances (abbreviations) are: N-trichloromethylthio-4-cyclohexene-1,2-dicarboximide (Captan); tri/dibromo salicylanilide (TBS); N-fluorodichloromethylthio-phthalamide (fluorofolpet); 3-iodo-2-propynyl-butyl carbamate (IPBC); 2-(4-thiazolyl)-benzimidazole (TBZ);

quaternary ammonium compounds (e.g., tetrabutylammonium chloride); phenyl mercuric acetate (PMA); bis(tributyltin) oxide (TBTO); tributyltin esters (TBT ester such as tributyltin acetate); zinc pyrithione (ZPT); N-butyl-1,2-benzisothiazolin-3-one (BBIT); N-trichloromethylthiophthalamide (Folpet); and silver containing glass, zeolite, ceramic, and inorganic carriers. Especially preferred non-peptidic antimicrobial substances (abbreviations) are: 10,10'-oxybisphenoxarsine (OBPA); 2-(normal-octyl)-4-isothiazolin-3-one (OIT); 4,5-dichloro-2-(normal-octyl)-4-isothiazolin-3-one (DCOIT); and 2,4,4'-trichloro-2'-hydroydiphenyl ether (TCPP). Other especially preferred non-peptidic antimicrobial substances are AEM 5700 (containing components having Chemical Abstracts Registry Numbers (CAS RegNos) [67-56-1], [27668-52-6], and 2530-87-2] and commercially available from Aegis Environments); X-Static (a 17% silver coated polyamide and commercially available from Noble Fiber Technologies); Alphasan RC 5000 or Alphasan RC 2000 (a silver zirconium phosphate having CAS RegNo [265647-11-8] and commercially available from Miliken Chemical); SmartSilver (a nanocrystalline silver having CAS RegNos [7440-22-4] and [9003-07-0] and commercially available from NanoHorizons); and Microban Additive b (having CAS RegNo [3380-34-5] and commercially available from Microban Products Company). Other preferred antibiotic, antiviral, antiparasitic, antifungal and antiprotozoal materials are described later.

The term "chelating agent" means a bidentate or multidentate ligand capable of coordinatively or ionically bonding, or a combination thereof, to a metal ion. Preferably, the ligand is non-peptidic. Also, the metal ion preferably is a so-called heavy metal cation such as, for example, an arsenic cation, mercury cation, or lead cation. Examples of such ligands are ethylenediaminetetraacetic acid (EDTA), citric acid, and polyphosphonic acids.

The term "clotting compound" means a thrombus formation-promoting substance.

The phrase "elongating under fiber-forming conditions" means subjecting a material to a means for increasing the material's aspect ratio until the material at least becomes thread-, filament-, or fibril-like. Examples of the means for increasing the material's aspect ratio are extruding, fiber drawing, textile spinning, spunbonding, solution electrospinning, melt electrospinning, solution electroblowing, melt electroblowing, and melt blowing. The means for increasing the material's aspect ratio are known and preferably employ conventional processing parameters such as temperature, voltage, gas flow, pressure, collector distance, atmosphere, and the like that are useful for extruding, fiber drawing, textile spinning, spunbonding, solution electrospinning, melt electrospinning, solution electroblowing, melt electroblowing, or melt blowing a melt of a polymer.

The term "finely-divided metal" means a particulate solid consisting essentially of (i.e., at least 95 percent by weight) one or more neutral elements of Groups 3 to 14 of the periodic table of the chemical elements and having an average diameter of 1000 μm or lower. Preferably, the average diameter is 1000 nm or lower. Preferably, the particulate solid will have an average particle size in the range of from about 0.001 μm to about 1000 μm, more preferably from about 0.05 μm to about 500 μm, still more preferably from about 0.1 μm to about 300 μm, and even more preferably from about 0.5 μm to about 150 μm. Particle size analysis methods and instruments are well known to the skilled person in the art. Preferably, particle size is determined using a Beckman Coulter RAPID-VUE™ instrument (Beckman Coulter Particle Characterization, Miami, Fla., USA). The particle size distribution is not critical and in some embodiments is characterized as being monodispersed, Gaussian, or random. Also preferably, the particulate solid is characterized as having a Braunauer-Emmett-Teller (BET) surface area of about 1 meter squared per gram ($m^2/g$) to about 1000 $m^2/g$, more preferably from about 10 $m^2/g$ to about 700 $m^2/g$, and still more preferably from about 50 $m^2/g$ to about 500 $m^2/g$.

Preferably, the finely-divided metal consists essentially of titanium (Ti), zirconium (Zr), chromium (Cr), molybdenum (Mo), tungsten (W), iron (Fe), ruthenium (Ru), cobalt (Co), rhodium (Rh), nickel (Ni), palladium (Pd), platinum (Pt), copper (Cu), silver (Ag), gold (Au), zinc (Zn), cadmium (Cd), aluminum (Al), gallium (Ga), carbon (C), silicon (Si), germanium (Ge), tin (Sn), lead (Pb), or an alloy of two or more thereof. More preferably, the finely-divided metal consists essentially of Pd, Pt, Cu, Ag, Au, or Zn. Still more preferably, the finely-divided metal consists essentially of Cu, Ag, Au, or Zn.

The term "highly filling amount" means a weight sufficient to prepare a highly filled composite.

The term "metal carbonate" means an organic particulate consisting of carbonate (i.e., $CO_3^{-2}$) or bicarbonate (i.e., $HCO_3^{-1}$) and one or more cationic elements of any one of Groups 3 to 14 of the periodic table of the chemical elements and having an average diameter of 1000 μm or lower. Preferably, the organic particulates have an average diameter of 1000 nm or lower.

Preferably, average particle size of the organic particulates is from about 0.001 μm to about 1000 μm, more preferably from about 0.05 μm to about 500 μm, still more preferably from about 0.1 μm to about 300 μm, and even more preferably from about 0.5 μm to about 150 μm. The particle size distribution is not critical and in some embodiments is characterized as being monodispersed, Gaussian, or random. The BET surface area of the organic particulates preferably is from about 1 $m^2/g$ to about 1000 $m^2/g$, preferably is from about 10 $m^2/g$ to about 700 $m^2/g$, and more preferably is from about 50 $m^2/g$ to about 500 $m^2/g$.

Preferred metal carbonates are sodium carbonate, sodium bicarbonate, lithium carbonate, lithium bicarbonate, potassium carbonate, potassium bicarbonate, magnesium carbonate, and calcium carbonate. More preferred organic particulates are sodium carbonate, sodium bicarbonate, and potassium bicarbonate.

The term "metal oxide" means an inorganic particulate consisting of oxygen and one or more cationic elements of any one of Groups 3 to 14 of the periodic table of the chemical elements. Preferably, the average particle size of the inorganic particulate is from about 0.001 μm to about 1000 μm, more preferably from about 0.05 μm to about 500 μm, still more preferably from about 0.1 μm to about 300 μm, and even more preferably from about 0.5 μm to about 150 μm. The particle size distribution is not critical and in some embodiments is characterized as being monodispersed, Gaussian, or random. The BET surface area of the inorganic particulates preferably is from about 1 $m^2/g$ to about 1800 $m^2/g$, more preferably from about 100 $m^2/g$ to about 1600 $m^2/g$, and still more preferably from about 200 $m^2/g$ to about 1400 $m^2/g$.

Preferred metal oxides are aluminum oxide, silicon dioxide, titanium dioxide, and zinc oxide. More preferred metal oxides are titanium dioxide and zinc oxide.

The term "microsphere" means an approximately round particle having an average diameter of 1000 micrometers (μm) or lower and being characterized as having or lacking interior (i.e., closed) pores. Preferably, the average diameter preferably is 1000 nanometers (nm) or lower.

Preferably, the majority of the approximately round particles have an average particle size of from about 0.001 μm to about 1000 μm, more preferably from about 0.05 μm to about 500 μm, still more preferably from about 0.1 μm to about 300 μm, and even more preferably from about 0.5 μm to about 150 μm. The particle size distribution is not critical and in some embodiments is characterized as being monodispersed, Gaussian, or random. The BET surface area of the approximately round particles is preferably from about 1 $m^2/g$ to about 1800 $m^2/g$, more preferably from about 100 $m^2/g$ to about 1600 $m^2/g$, and still preferably from about 200 $m^2/g$ to about 1400 $m^2/g$.

Preferably, the approximately round particle comprises a thermoplastic polymer, thermoset polymer, cross-linked polymer (e.g., cross-linked polymer beads with or without ion-exchangeable functional groups), metal, ceramic or glass. Also preferably, the microspheres are characterized as having a microporosity of from about 0.2 cubic centimeters per gram (cc/g) to about 0.4 cc/g; a mesoporosity of at least about 0.3 cc/g, more preferably at least about 0.5 cc/g; and a total porosity of at least about 0.8 cc/g, more preferably at least about 1.5 cc/g, and the microporosity comprises less than about 40 percent, more preferably less than about 20 percent, of the total porosity.

BET surface area, pore size and porosity are determined on a Quantachrome Model Autosorb-1 nitrogen adsorption analyzer by measuring the volume of gaseous nitrogen adsorbed by a sample at a given nitrogen partial pressure and by conducting the appropriate calculations according to the BET model. Micropores are defined as pores of less than 2 nm in diameter.

Mesopores are defined as pores ranging from 2 to 20 nm in diameter. Macropores are defined as pores of greater than 20 nm in diameter. The terms microporosity, mesoporosity and macroporosity refer to the pore volume per gram of sample for each type of respective pore and are reported in units of cc/g. These porosities, as well as BET surface area and average pore size, are determined by the nitrogen adsorption method in which dried and degassed samples are analyzed on an automatic volumetric sorption analyzer, Quantachrome Model Autosorb-1 nitrogen adsorption analyzer. The instrument works on the principle of measuring the volume of gaseous nitrogen adsorbed by a sample at a given nitrogen partial pressure. The volumes of gas adsorbed at various pressures are used in the BET model for the calculation of the BET surface area of the sample. The average pore radius is calculated from the relationship between the BET surface area and the pore volume of the sample, assuming cylindrical pore geometry.

The term "non-peptidic" means lacking an oligomer or polymer comprising two or more alpha-amino acids (including naturally occurring and man-made alpha-amino acids).

The term "odor control material" means a deodorant substance that absorbs, adsorbs, sequesters, masks, or reacts with an odorant, or inhibits production of the odorant. Preferred odor controlling materials absorb, adsorb, sequester, mask, or react with the odorant.

Unless otherwise noted, the phrase "Periodic Table of the Elements" refers to the official periodic table, version dated Jun. 22, 2007, published by the International Union of Pure and Applied Chemistry (IUPAC). Group 3 elements (symbol) useful in the present invention are scandium (Sc), yttrium (Y), the lanthanides, especially lanthanum (La), cerium (Ce), praseodymium (Pr), neodymium (Nd), promethium (Pm), samarium (Sm), europium (Eu), gadolinium (Gd), terbium (Tb), dysprosium (Dy), holium (Ho), erbium (Er), thulium (Tm), ytterbium (Yb), and lutetium (Lu), and the actinoids, especially actinium (Ac), thorium (Th), protactinium (Pa), uranium (U), neptunium (Np), plutonium (Pu), americium (Am), curium (Cu), berkelium (Bk), californium (Cf), einsteinium (Es) fermium (Fm), mendelevium (Md), nobelium (No), and lawrencium (Lr).

Preferred Group 3 elements are Sc and Y. In addition to titanium (Ti), zirconium (Zr), and hafnium (Hf), another Group 4 element useful in the present invention is rutherfordium (Rf). Group 5 elements useful in the present invention are vanadium (V), niobium (Nb), tantalum (Ta), and dubnium (Db). Preferred Group 5 elements are V, Nb, and Ta. Group 6 elements useful in the present invention are chromium (Cr), molybdenum (Mo), tungsten (W), and seaborgium (Sg). Preferred Group 6 elements are Cr, Mo, and W.

The term "polyelectrolyte" means an ionizable organic polymer comprising at least one repeat unit bearing an acid or base functionality, or a respective conjugate base or acid thereof, that is capable of disassociating in pH 7 water. Ionizable organic polymers include polycations, polyanions, and polyampholytes. Examples of polycations are polyethyleneimine, poly(2-(dimethylamino)ethyl methacrylate), poly(2-dimethylamino ethyl methacrylate), poly(N-[3-(dimethylamino)propyl]methacrylamide), polydiallyldimethylammonium chlorides, polyvinylpyridines, poly(4-vinylaniline), polyvinylamine, cationic hydroxyethyl cellulose, (for example, UCARE JR-09, JR-400, LR-400 and JR-30M from Amerchol Corporation, USA), a chiosonium pyrrolidone carboxylate (available commercially as KYTAMER™ PC from Amerchol Corporation), and their conjugate acids. Examples of polyanions are poly(sodium styrene sulfonate), poly(acrylic acid), poly(methacrylic acid), and salts thereof. Examples of polyampholytes are a copolymer derived from vinyl pyridine and methacrylic acid. Examples of acid functionalities are carboxylic and sulfonic acids. Conjugate bases of carboxylic and sulfonic acids include sodium carboxylates and sulfonates, respectively. Examples of base functionalities are primary, secondary, and tertiary alkyl amines and pyridines. Conjugate acids of primary, secondary, and tertiary alkyl amines and pyridines include protonated and methylated primary, secondary, and tertiary ammonium and pyridinium salts, respectively.

The term "$T_g$" means glass transition temperature as determined by techniques known in the art such as differential scanning calorimetry (DSC).

The term "$T_m$" means melting temperature (i.e., melting point) as determined by techniques known in the art, preferably by differential scanning calorimetry (DSC). If a MSA material has one or more $T_m$, preferably at least one $T_m$ is 25 degrees Celsius (° C.) or higher.

The term "viscosity" means zero shear viscosity unless specified otherwise.

The term "wound healing promoter" means a dermal and epidermal tissue-regenerating stimulant. Preferably, the dermal and epidermal tissue-regenerating stimulant comprises one or more of platelet-enriched plasma, a debriding agent, vitamin A, vitamin C, collagen, estrogen, dihydroepiandrosterone (DHEA), and finely-divided titanium dioxide (preferably with ultraviolet light therapy). A "debriding agent" means a dead tissue removing substance. Preferred dead tissue removing (e.g., by reaction therewith such as reaction leading to degradation of dead tissue) substances are a collagenase enzyme, a papain-urea enzyme, polyacrylate particles (e.g., TenderWet™, IVF Hartman AG)

Active Agents

Preferred antibiotic substances are silver compounds and compounds selected from the following structural classes of antibiotics: aminoglycosides, beta-lactams, cephalosporins, macrolides, penicillins, fluoroquinolones, sulfonamides, and tetracyclines. More preferably, antibiotic substances are silver compounds such as, for example, silver salts, silver complex ions, colloidal silver, silver/zeolite composites, silver/phosphate, silver/glass particles (antimicrobial, controlled release), and mixtures thereof. Preferred silver salts are silver chloride, silver nitrate, silver acetate, silver benzoate, silver bromate, silver chlorate, silver lactate, silver molybdate, silver nitrite, silver(I) oxide, silver perchlorate, silver permanganate, silver selenate, silver selenite, silver sulfadiazine, silver sulfate, and mixtures thereof. Preferred silver complex ions are silver chloro complex ions, silver thiosulfato complex ions, or mixtures thereof. Preferred colloidal silver particles are silver nanoparticles, including nanocrystalline silver such as, for example, SICRYST™ nanocrystals (Nucryst Pharmaceuticals Corporation).

Preferred antifungal substances are from the following structural classes: allylamines, echinocandins, imidazoles, polyenes, and triazoles.

Preferred antiviral substances are from the following activity classes: anti-hepatitis virus, anti-herpes virus, anti-human immunodeficiency virus (HIV), and anti-influenza virus, including anti-avian influenza virus.

Preferred antiparasitic substances are from the following activity classes: antinematodes, anticestodes, antitrematodes, antiamoebics, and antiprotozoals.

Preferred antiprotozoal substances are from the following activity classes: antimalarials (e.g., chloroquine and artemisinin) and agents against leishmaniasis or trpanosomiasis.

Preferred odor control agents are finely-divided metals, metal carbonates, metal oxides, microspheres, magadiite, silica, talc, extracts from quillaja, yucca, and aloe plants, fragrances, cyclodextrins, chitosan, activated carbon, carbon nanotubes, and zeolites. A preferred silica is fumed silica. A preferred metal oxide is silicon dioxide, titanium dioxide, aluminum oxide, magnesium oxide, or zinc oxide. A preferred metal carbonate or metal bicarbonate is sodium bicarbonate, sodium carbonate, lithium bicarbonate, lithium carbonate, potassium carbonate, or potassium bicarbonate. A preferred finely-divided metal is finely divided gold, silver, copper, or zinc.

In some embodiments, the active agent is in the form of a particulate solid. Preferred particulate solids are characterized as having morphology of platelets, tubes (e.g., carbon nanotubes, including single-wall carbon nanotubes (SWNT)), cylinders, polycylinders, spheres, balls (e.g., fullerene types), polyhedrals, discs, needles, polyneedles, cubes, irregular shapes, ellipsoids, wiskers, or mixtures of two or more thereof.

Preferably, the one or more active agents comprise a total of at least about 0.0001 weight percent (wt %), more preferably at least 0.01 wt %, still more preferably at least 0.1 wt %, and even more preferably at least 1.0 wt % of the activated polymer composition of the first embodiment based on total weight of the activated polymer composition. Also preferably, the one or more active agents comprise a total of about 75 wt % or less, more preferably 50 wt % or less, still more preferably 30 wt % or less, and even more preferably about 20 wt % or less of the activated polymer composition of the first embodiment based on total weight of the activated polymer composition.

Molecularly Self-Assembling Material

As used herein a MSA material means an oligomer or polymer that effectively forms larger associated or assembled oligomers and/or polymers through the physical intermolecular associations of chemical functional groups. Without wishing to be bound by theory, it is believed that the intermolecular associations do not increase the molecular weight (Mn-Number Average molecular weight) or chain length of the self-assembling material and covalent bonds between said materials do not form. This combining or assembling occurs spontaneously upon a triggering event such as cooling to form the larger associated or assembled oligomer or polymer structures. Examples of other triggering events are the shear-induced crystallizing of, and contacting a nucleating agent to, a molecularly self-assembling material. Accordingly, in preferred embodiments MSAs exhibit mechanical properties similar to some higher molecular weight synthetic polymers and viscosities like very low molecular weight compounds. MSA organization (self-assembly) is caused by non-covalent bonding interactions, often directional, between molecular functional groups or moieties located on individual molecular (i.e. oligomer or polymer) repeat units (e.g. hydrogen-bonded arrays). Non-covalent bonding interactions include: electrostatic interactions (ion-ion, ion-dipole or dipole-dipole), coordinative metal-ligand bonding, hydrogen bonding, $\pi$-$\pi$-structure stacking interactions, donor-acceptor, and/or van der Waals forces and can occur intra- and intermolecularly to impart structural order. One preferred mode of self-assembly is hydrogen-bonding and this non-covalent bonding interactions is defined by a mathematical "Association constant", K(assoc) constant describing the relative energetic interaction strength of a chemical complex or group of complexes having multiple hydrogen bonds. Such complexes give rise to the higher-ordered structures in a mass of MSA materials. A description of self assembling multiple H-bonding arrays can be found in "Supramolecular Polymers", Alberto Ciferri Ed., 2nd Edition, pages (pp) 157-158. A "hydrogen bonding array" is a purposely synthesized set (or group) of chemical moieties (e.g. carbonyl, amine, amide, hydroxyl. etc.) covalently bonded on repeating structures or units to prepare a self assembling molecule so that the individual chemical moieties preferably form self assembling donor-acceptor pairs with other donors and acceptors on the same, or different, molecule. A "hydrogen bonded complex" is a chemical complex formed between hydrogen bonding arrays. Hydrogen bonded arrays can have association constants K (assoc) between $10^2$ and $10^9$ $M^{-1}$ (reciprocal molarities), generally greater than $10^3$ $M^{-1}$. In preferred embodiments, the arrays are chemically the same or different and form complexes.

Accordingly, the molecularly self-assembling materials (MSA) presently include: molecularly self-assembling polyesteramides, copolyesteramide, copolyetheramide, copolyetherester-amide, copolyetherester-urethane, copolyether-urethane, copolyester-urethane, copolyester-urea, copolyetherester-urea and their mixtures. Preferred MSA include copolyesteramide, copolyether-amide, copolyester-urethane, and copolyether-urethanes. The MSA preferably has number average molecular weights, $MW_n$ (interchangeably referred to as $M_n$) (as is preferably determined by NMR spectroscopy) of 2000 grams per mole or more, more preferably at least about 3000 g/mol, and even more preferably at least about 5000 g/mol. The MSA preferably has $MW_n$ 50,000 g/mol or less, more preferably about 20,000 g/mol or less, yet more preferably about 15,000 g/mol or less, and even more preferably about 12,000 g/mol or less. The MSA material preferably comprises molecularly self-assembling repeat units, more preferably comprising (multiple) hydrogen bonding arrays, wherein the arrays have an association constant K (assoc) preferably from $10^2$ to $10^9$ reciprocal molarity ($M^{-1}$) and still more preferably greater than $10^3$ $M^{-1}$; association of multiple-hydrogen-bonding arrays comprising donor-acceptor hydrogen bonding moieties is the preferred mode of self assembly. The multiple H-bonding arrays preferably comprise an average of 2 to 8, more preferably 4-6, and still more preferably at least 4 donor-acceptor hydrogen bonding moieties per molecularly self-assembling unit. Molecularly self-assembling units in preferred MSA materials include bis-amide groups, and bis-urethane group repeat units and their higher oligomers.

Preferred self-assembling units in the MSA material useful in the present invention are bis-amides, bis-urethanes and bis-urea units or their higher oligomers. A more preferred self-assembling unit comprises a poly(ester-amide), poly(ether-amide), poly(ester-urea), poly(ether-urea), poly(ester-urethane), or poly(ether-urethane), or a mixture thereof. For convenience and unless stated otherwise, oligomers or polymers comprising the MSA materials may simply be referred to herein as polymers, which includes homopolymers and interpolymers such as co-polymers, terpolymers, etc.

In some embodiments, the MSA materials include "non-aromatic hydrocarbylene groups" and this term means specifically herein hydrocarbylene groups (a divalent radical formed by removing two hydrogen atoms from a hydrocarbon) not having or including any aromatic structures such as aromatic rings (e.g. phenyl) in the backbone of the oligomer or polymer repeating units. In some embodiments, non-aromatic hydrocarbylene groups are optionally substituted with various substituents, or functional groups, including but not limited to: halides, alkoxy groups, hydroxy groups, thiol groups, ester groups, ketone groups, carboxylic acid groups, amines, and amides. A "non-aromatic heterohydrocarbylene" is a hydrocarbylene that includes at least one non-carbon atom (e.g. N, O, S, P or other heteroatom) in the backbone of the polymer or oligomer chain, and that does not have or include aromatic structures (e.g., aromatic rings) in the backbone of the polymer or oligomer chain. In some embodiments, non-aromatic heterohydrocarbylene groups are optionally substituted with various substituents, or functional groups, including but not limited to: halides, alkoxy groups, hydroxy groups, thiol groups, ester groups, ketone groups, carboxylic acid groups, amines, and amides. Heteroalkylene is an alkylene group having at least one non-carbon atom (e.g. N, O, S or other heteroatom) that, in some embodiments, is optionally substituted with various substituents, or functional groups, including but not limited to: halides, alkoxy groups, hydroxy groups, thiol groups, ester groups, ketone groups, carboxylic acid groups, amines, and amides. For the purpose of this disclosure, a "cycloalkyl" group is a saturated carbocyclic radical having three to twelve carbon atoms, preferably three to seven. A "cycloalkylene" group is an unsaturated carbocyclic radical having three to twelve carbon atoms, preferably three to seven. Cycloalkyl and cycloalkylene groups independently are monocyclic or polycyclic fused systems as long as no aromatics are included. Examples of carbocyclic radicals include cyclopropyl, cyclobutyl, cyclopentyl, cyclohexyl and cycloheptyl. In some embodiments, the groups herein are optionally substituted in one or more substitutable positions as would be known in the art. For example in some embodiments, cycloalkyl and cycloalkylene groups are optionally substituted with, among others, halides, alkoxy groups, hydroxy groups, thiol groups, ester groups, ketone groups, carboxylic acid groups, amines, and amides. In some embodiments, cycloalkyl and cycloalkene groups are optionally incorporated into combinations with other groups to form additional substituent groups, for example: "-Alkylene-cycloalkylene-", "-alkylene-cycloalkylene-alkylene-", "-heteroalkylene-cycloalkylene-", and "-heteroalkylene-cycloalkyl-heteroalkylene" which refer to various non-limiting combinations of alkyl, heteroalkyl, and cycloalkyl. These combinations include groups such as oxydialkylenes (e.g., diethylene glycol), groups derived from branched diols such as neopentyl glycol or derived from cyclo-hydrocarbylene diols such as Dow Chemical's UNOXOL® isomer mixture of 1,3- and 1,4-cyclohexanedimethanol, and other non-limiting groups, such as -methylcylohexyl-, -methyl-cyclohexyl-methyl-, and the like. "Heterocycloalkyl" is one or more cyclic ring systems having 4 to 12 atoms and, containing carbon atoms and at least one and up to four heteroatoms selected from nitrogen, oxygen, or sulfur. Heterocycloalkyl includes fused ring structures. Preferred heterocyclic groups contain two ring nitrogen atoms, such as piperazinyl. In some embodiments, the heterocycloalkyl groups herein are optionally substituted in one or more substitutable positions. For example in some embodiments, heterocycloalkyl groups are optionally substituted with halides, alkoxy groups, hydroxy groups, thiol groups, ester groups, ketone groups, carboxylic acid groups, amines, and amides.

Examples of MSA materials useful in the present invention are poly(ester-amides), poly(ether-amides), poly(ester-ureas), poly(ether-ureas), poly(ester-urethanes), and poly(ether-urethanes), and mixtures thereof that are described, with preparations thereof, in United States Patent Number (USPN) U.S. Pat. No. 6,172,167; and applicant's co-pending PCT application numbers PCT/US2006/023450, which was renumbered as PCT/US2006/004005 and published under PCT International Patent Application Number (PCT-IPAPN) WO 2007/099397; PCT/US2006/035201, which published under PCT-IPAPN WO 2007/030791; PCT/US08/053,917; PCT/US08/056,754; and PCT/US08/065,242. Preferred said MSA materials are described below.

In a set of preferred embodiments, the molecularly self-assembling material comprises ester repeat units of Formula I:

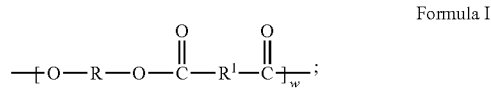

and at least one second repeat unit selected from the esteramide units of Formula II and III:

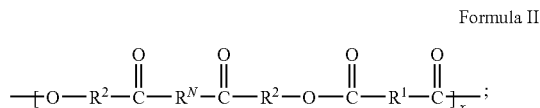

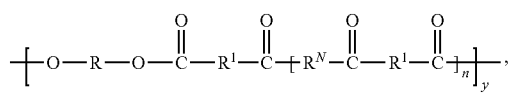

and the ester-urethane units of Formula IV:

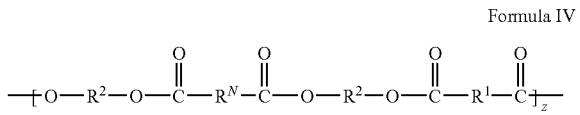

wherein

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 to about 5000 g/mol. In preferred embodiments, the $C_2$-$C_{20}$ non-aromatic hydrocarbylene at each occurrence is independently specific groups: alkylene-, -cycloalkylene-, -alkylene-cycloalkylene-, -alkylene-cycloalkylene-alkylene-(including dimethylene cyclohexyl groups). Preferably, these aforementioned specific groups are from 2 to 12 carbon atoms, more preferably from 3 to 7 carbon atoms. The $C_2$-$C_{20}$ non-aromatic heterohydrocarbylene groups are at each occurrence, independently specifically groups, non-limiting examples including: -hetereoalkylene-, -heteroalkylene-cycloalkylene-, -cycloalkylene-heteroalkylene-, or -heteroalkylene-cycloalkylene-hetereoalkylene-, each aforementioned specific group preferably comprising from 2 to 12 carbon atoms, more preferably from 3 to 7 carbon atoms. Preferred heteroalkylene groups include oxydialkylenes, for example diethylene glycol (—$CH_2CH_2OCH_2CH_2$—O—). When R is a polyalkylene oxide group it preferably is a polytetramethylene ether, polypropylene oxide, polyethylene oxide, or their combinations in random or block configuration wherein the molecular weight (Mn-average molecular weight, or conventional molecular weight) is preferably about 250 g/ml to 5000, g/mol, more preferably more than 280 g/mol, and still more preferably more than 500 g/mol, and is preferably less than 3000 g/mol; in some embodiments, mixed length alkylene oxides are included. Other preferred embodiments include species where R is the same $C_2$-$C_6$ alkylene group at each occurrence, and most preferably it is —$(CH_2)_4$—.

$R^1$ is at each occurrence, independently, a bond, or a $C_1$-$C_{20}$ non-aromatic hydrocarbylene group. In some preferred embodiments, $R^1$ is the same $C_1$-$C_6$ alkylene group at each occurrence, most preferably —$(CH_2)_4$—.

$R^1$ is at each occurrence, independently, a $C_1$-$C_{20}$ non-aromatic hydrocarbylene group. According to another embodiment, $R^1$ is the same at each occurrence, preferably $C_1$-$C_6$ alkylene, and even more preferably $R^2$ is —$(CH_2)_2$—, —$(CH_2)_3$—, —$(CH_2)_4$—, or —$(CH_2)_5$—.

$R^2$ is at each occurrence —$N(R^3)$—Ra—$N(R^3)$—, where $R^3$ is independently H or a $C_1$-$C_6$ alkyl, preferably $C_1$-$C_4$ alkyl, or $R^N$ is a $C_2$-$C_{20}$ heterocycloalkylene group containing the two nitrogen atoms, wherein each nitrogen atom is bonded to a carbonyl group according to Formula II or III above; w represents the ester mol fraction, and x, y and z represent the amide or urethane mole fractions where w+x+y+z=1, 0<w<1, and at least one of x, y and z is greater than zero. Ra is a $C_2$-$C_{20}$ non-aromatic hydrocarbylene group, more preferably a $C_2$-$C_{12}$ alkylene: most preferred Ra groups are ethylene butylene, and hexylene —$(CH_2)_6$—. In some embodiments, $R^N$ is piperazin-1,4-diyl. According to another embodiment, both $R^3$ groups are hydrogen.

n is at least 1 and has a mean value less than 2.

In an alternative embodiment, the MSA is a polymer consisting of repeat units of either Formula II or Formula III, wherein R, $R^1$, $R^2$, $R^N$, and n are as defined above and x and y are mole fractions wherein x+y=1, and $0 \leq x \leq 1$ and $0 \leq y \leq 1$.

In certain embodiments comprising polyesteramides of Formula I and II, or Formula I, II, and III, particularly preferred materials are those wherein R is —$(C_2$-$C_6)$-alkylene, especially —$(CH_2)_4$—. Also preferred are materials wherein $R^1$ at each occurrence is the same and is $C_1$-$C_6$ alkylene, especially —$(CH_2)_4$—. Further preferred are materials wherein $R^2$ at each occurrence is the same and is —$(C_1$-$C_6)$-alkylene, especially —$(CH_2)_5$— alkylene. The polyesteramide according to this embodiment preferably has a number average molecular weight (Mn) of at least about 4000, and no more than about 20,000. More preferably, the molecular weight is no more than about 12,000.

For convenience the chemical repeat units for various embodiments are shown independently. The invention encompasses all possible distributions of the w, x, y, and z units in the copolymers, including randomly distributed w, x, y and z units, alternatingly distributed w, x, y and z units, as well as partially, and block or segmented copolymers, the definition of these kinds of copolymers being used in the conventional manner as known in the art. Additionally, there are no particular limitations in the invention on the fraction of the various units, provided that the copolymer contains at least one w and at least one x, y, or z unit. In some embodiments, the mole fraction of w to (x+y+z) units is between about 0.1:0.9 and about 0.9:0.1. In some preferred embodiments, the copolymer comprises at least 15 mole percent w units, at least 25 mole percent w units, or at least 50 mole percent w units In some embodiments, the number average molecular weight ($M_n$) of the MSA material useful in the present invention is between 1000 g/mol and 30,000 g/mol, inclusive. In some embodiments, $M_n$ of the MSA material is between 2,000 g/mol and 20,000 g/mol, inclusive, preferably 5,000 g/mol to 12,000 g/mol. In more preferred embodiments, $M_n$ of the MSA material is less than 5,000 g/mol. Thus, in some more preferred embodiments, $M_n$ of the MSA material is at least about 1000 g/mol and 4,900 g/mol or less, more preferably 4,500 g/mol or less.

For preparing fibers comprising the MSA material useful in the present invention, including the activated fibers, viscosity of a melt of a preferred MSA material is characterized as being Newtonian over the frequency range of $10^{-1}$ to $10^2$ radians per second (rad./s.) at a temperature from above a melting temperature $T_m$ up to about 40° C. above $T_m$, preferably as determined by differential scanning calorimetry (DSC). Depending upon the polymer or oligomer, preferred MSA materials exhibit Newtonian viscosity in the test range frequency at temperatures above 100° C., more preferably above 120° C. and more preferably still at or above 140° C. and preferably less than 300° C., more preferably less than 250° C. and more preferably still less than 200° C. For the purposes of the present disclosure, the term Newtonian has its conventional meaning; that is, approximately a constant viscosity with increasing (or decreasing) shear rate of a (MSA) material at a constant testing temperature. The MSA materials, preferably having $M_n$ less than 5,000 g/mol, advantageously possess low melt viscosities useful for high output (relative to traditional high polymer electrospinning) fiber electrospinning and utilities in submicron-fiber form. The MSA materials having $M_n$ of about 7,000 g/mol or higher are particularly useful for melt blowing. The zero shear viscosity of a preferred MSA material is in the range of from 0.1 Pascal-second (Pa·s.) to 1000 Pa·s., preferably from 0.1 Pa·s. to 100 Pa·s., more preferably from 0.1 to 30 Pa·s., still more preferred 0.1 Pa·s. to 10 Pa·s., between the temperature range of 180° C. and 220° C., e.g., 180° C. and 190° C.

Preferably, the viscosity of a melt of a MSA material useful in the present invention is less than 100 Pa·s. at from above $T_m$ up to about 40° C. above $T_m$. The viscosity of one of the preferred MSA materials is less than 100 Pa·s. at 190° C., and more preferably in the range of from 1 Pa·s. to 50 Pa·s. at 150° C. to 170° C. Preferably, the glass transition temperature of the MSA material is less than 20° C. Preferably, the melting point is higher than 60° C. Preferred MSA materials exhibit multiple glass transition temperatures $T_g$. Preferably, the MSA material has a $T_g$ that is higher than −80° C. Also preferably, the MSA material has a $T_g$ that is higher than −60° C.

For preparing fibers comprising the MSA materials useful in the invention, including the activated fibers, especially by melt electrospinning or melt blowing, the tensile modulus of one preferred group of MSA materials is preferably from 4 megapascals (MPa) to 500 MPa at room temperature, preferably 20° C. Tensile modulus testing is well known in the polymer arts.

Preferably, the torsional (dynamic) storage modulus of MSA materials useful in the invention is 12 MPa, more preferably at least 50 MPa, still more preferably at least 100 MPa, all at 20° C. Preferably, the storage modulus is 400 MPa or lower, more preferably 300 MPa or lower, still more preferably 250 MPa or lower, or still more preferably about 200 MPa or lower, all at 20° C.

Preferably, polydispersities of substantially linear MSA materials useful in the present invention is 4 or less, more preferably 3 or less, still more preferably 2.5 or less, still more preferably 2.2 or less.

In some embodiments, the polymers described herein are modified with, for example and without limitation thereto, other polymers, resins, tackifiers, fillers, oils and additives (e.g. flame retardants, antioxidants, pigments, dyes, and the like).

Activated Fibers

Activated fibers comprising the MSA material and one or more active agents useful in the present invention are fabricated under fiber-forming conditions such as, for example, extruding, fiber drawing, textile spinning, spunbonding, melt electrospinning, melt electroblowing, melt blowing, solution electroblowing, and solution electrospinning device. Preferably, the fiber-forming condition is melt blowing or melt electrospinning.

Preferably, the activated fibers are fabricated with a fiber-fabricating device. More preferably, the device is a spunbonding device, melt electrospinning device, melt blowing device, or electroblowing device, solution electroblowing, and solution electrospinning device. Preferably, the fiber-fabricating device further comprises a collector. More preferably, the collector yields a fiberweb support. When the collector yields the fiberweb support, the process of the fifth embodiment preferably directly yields the activated-fiber composite of the third embodiment. The collector may or, preferably, may not be in physical contact with the fiber-fabricating device during the process of the fifth embodiment. In some embodiments when the collector does not yield a fiberweb support, the activated fiber of the second embodiment is produced.

Activated fibers having an average diameter of from about 1.5 µm to about 10 µm are preferentially prepared via melt blowing. Activated fibers having an average diameter of from about 10 µm to about 50 µm (e.g., from about 10 µm to about 30 µm) are preferentially prepared via spunbond fibers.

In preferred embodiments, the activated fibers have an average diameter of from about 0.010 µm to about 50 µm, and preferably from about 0.010 µm to about 30 µm. In some embodiments, the average diameter is at least about 0.10 µm. In other embodiments, the average diameter is at least about 0.2 µm, at least about 1.5 µm, or at least about 10 µm. In some embodiments of the present invention, the average diameter is about 20 µm or less. In other embodiments, the average diameter is about 10 µm or less, about 1.5 µm or less, or about 1.0 µm or less.

Preferably, the contacting one or more active agents step is performed by mixing the one or more active agents with the melt or the solution before the melt or solution is elongated into the activated fiber. Alternatively, the melt or solution is elongated and essentially simultaneously contacted with the one or more active agents to produce the activated fiber.

Alternatively still, the melt or solution is elongated into a precursor fiber comprising the MSA material, and then the one or more active agents are contacted to the precursor fiber to produce the activated fiber.

In some embodiments, the contacting one or more active agents step occurs before the elongating step. In such embodiments, the process comprises the steps of: first contacting the one or more active agents to the molecularly self-assembling material so that the melt comprises a first mixture comprising the one or more active agents and the molecularly self-assembling material or the solution comprises a second mixture comprising the solvent, the one or more active agents, and the molecularly self-assembling material; and then elongating under fiber-forming conditions either the melt comprising the first mixture or the solution comprising the second mixture to produce the activated fiber. The solution can be prepared by contacting the solvent, independently one or more active agents, and the molecularly self-assembling material to each other in any sequence, e.g., contacting the one or more active agents to the solvent to give a mixture thereof, and contacting that mixture to the molecularly-self assembling material.

In other embodiments, the contacting step occurs after the elongating step. In such other embodiments, the process comprises the steps of: first elongating under fiber-forming conditions either the melt comprising the molecularly self-assembling material or the solution comprising the solvent and the molecularly self-assembling material to produce a precursor fiber comprising the molecularly self-assembling material and lacking the one or more active agents; and then contacting the one or more active agents to the precursor fiber to produce the activated fiber.

In still other embodiments, at least a portion of the contacting step occurs during (i.e., simultaneous with) at least a portion of the elongating step. In such still other embodiments, the process comprises the steps of: elongating under fiber-forming conditions either the melt comprising the molecularly self-assembling material and lacking the one or more active agents, or the solution comprising the solvent and the molecularly self-assembling material and lacking the one or more active agents; and contacting the one or more active agents to the molecularly self-assembling material of the melt or solution to produce the activated fiber, each of the elongating and contacting steps having an overlapping portion, the overlapping portions occurring simultaneously with (i.e., at the same time as) each other.

Where there are two or more active agents, the order of the contacting one or more active agents and elongating steps is independently selected for each of the two or more active agents.

Producing Activated Fibers by Solution Electrospinning

Preferred activated polymer compositions are solution electrospun into activated fibers, including submicron diameter activated fibers, from solutions having viscosities, in a temperature range of from 20° C. to 50° C., preferably at 20° C., from about 0.001 Pa·s to about 0.5 Pa·s, preferably at least about 0.005 Pa·s., more preferably at least about 0.01 Pa·s. The combination of the low solution viscosities of the MSA materials useful in the present invention coupled with the ability to electrospin the MSA materials at a variety of temperatures means that various concentrations, including low solution concentrations and high solution concentrations, of the MSA materials is easily used for electrospinning activated polymer compositions. The MSA material is present in the solution at a concentration of from greater than 0 weight percent (wt %) to less than 100 wt %, preferably in some embodiments of the present invention from about 4 wt % to about 30 wt %, and in other embodiments from greater than 40 wt % to 99.9 wt %. Consequently, higher activated-fiber production rates are possible with the preferred materials for a given solution electrospinning device than have been achieved with conventional polymers that self-associate substantially via an entanglement mechanism.

For present purposes, weight percent concentration of a MSA material in the solution-electrospinning solvent is calculated by dividing the weight of the MSA material dissolved in the solvent by the sum of the weight of the MSA material dissolved in the solvent plus weight of the solvent. Weight of any undissolved MSA material is not counted in determining said weight percent concentration.

Preferred solutions are characterized as being capable of being electrospun from a needle at a high production rate, preferably at a rate greater than 4.5 milliliters per hour, more preferably at a rate greater than 10 mL/hour. This characterization of the solution does not limit the electrospinning device to a particular type thereof.

In one solution electrospinning method, a solution of the activated polymer composition dissolved in a solvent is fed into or onto the spinneret from, for example, a syringe at a constant and controlled rate using a metering pump. A high voltage (1 kilovolt (kV) to 120 kV, preferably 1 kV to 100 kV, and more preferably 1 kV to 50 kV) is applied and a portion of the activated polymer composition, preferably in the form of a droplet, at the nozzle (e.g., needle) of the syringe becomes highly electrified. At a characteristic voltage the portion (e.g., droplet) forms one or more Taylor cones, and a fine jet, in some embodiments of the present invention two or more such jets, of the activated polymer composition develops. The fine jet of activated polymer composition is drawn towards the grounded conductor which is placed opposing the spinneret.

While being drawn towards the grounded conductor, the solution-electrospinning solvent at least partially dissipates (e.g., at least partially phase separates, evaporates, or a combination thereof) and the jet solidifies into activated fibers. Preferably, the solution-electrospinning solvent is substantially completely dissipated (i.e., lost) from the activated fibers. Substantially complete dissipation of the solvent from the activated fibers (e.g., loss of at least 95 wt %, more preferably at least 99 wt % of the solvent from the fibers) may occur before, during, or after the activated fibers are deposited and may comprise part of a solution electrospinning unit operation or a separate unit operation (e.g., a drying operation that may or may not be in direct communication with the solution electrospinning unit operation). Preferably, the activated fibers are deposited on a collector that is placed in front of the conductor. In some embodiments, the activated fibers are deposited on the collector as a randomly oriented, nonwoven mat. The activated fibers are subsequently stripped from the collector if desired. In other embodiments, a charged conductor (opposite polarity to that of electrode) is employed instead of the grounded conductor.

The parameters for operating the electrospinning apparatus may be readily determined by a person of ordinary skill in the art without undue experimentation. By way of example, the spinneret is operated at about 20° C. or ambient temperature, the spin electrode is maintained at the same temperature or temperature at which the MSA material has sufficiently low viscosity to allow thin (e.g., average diameter below 1000 nm) fiber formation. If desired, the spinneret is generally heated up to about 300° C. and the surrounding environmental temperature optionally is maintained at about similar temperatures (e.g., by using hot air). Alternatively, the spinneret is generally heated up to about 300° C. and the surrounding environmental temperature optionally is maintained at about room temperature (i.e., from about 20° C. to 30° C.). The applied voltage is generally about 1 kV to 120 kV, preferably about 1 kV to 100 kV, more preferably 1 kV to 50 kV. The electrode gap (the gap between spin electrode and conductor) is generally between about 3 centimeters (cm) and about 50 cm, preferably between about 3 cm and about 40 cm.

Preferably, the activated fibers are fabricated at about ambient pressure (e.g., 1.0 atmosphere), although the pressure may be higher or lower depending upon the particular operating conditions employed such as solvent(s), concentrations of solutions of MSA materials, and temperatures.

Preferred electrospinning devices are those that are marketed commercially as being useful for solution electrospinning. Use of commercially available solution electrospinning devices, such as those available from NanoStatics™, LLC, Circleville, Ohio, USA; and Elmarco s.r.o., Liberec, Czech Republic (e.g., using Nanospider™ technology), are more preferred.

Various solvents are used in the solution electrospinning process. A preferred solution-electrospinning solvent is (monohalo to perhalo)$(C_1-C_6)$alkyl; $R^1C(O)OR^2$; $R^1C(O)NR^3R^4$; $R^3OR^4$; $R^5C(O)R^6$; or a mixture thereof, wherein each halo independently is fluoro or chloro, each $R^1$ and $R^2$ independently is H or $(C_1-C_3)$alkyl, each $R^3$ and $R^4$ independently is H or $(C_1-C_3)$alkyl or $R^3$ and $R^4$ taken together form a $(C_2-C_6)$alkylene, and each $R^5$ and $R^6$ independently is $(C_1-C_3)$alkyl or $R^5$ and $R^6$ taken together form a $(C_2-C_6)$alkylene. A more preferred solvent is chloroform, methanol, water, formic acid, alcohols (e.g., $R^3OR^4$ wherein $R^3$ is $(C_1-C_3)$alkyl and $R^4$ is H), N,N-dimethylformamide, tetrahydrofuran, 1,2-dichloroethane, ethyl acetate, methylethylketone, or mixtures thereof. Still more preferred are chloroform and formic acid.

For electrospinning solvents, the term "$(C_1-C_3)$alkyl" means methyl, ethyl, 1-propyl, or 2-propyl. The term "$(C_2-C_6)$alkylene" means a straight or branched hydrocarbon diradical of 2 to 6 carbon atoms. The $(C_1-C_3)$alkyl and $(C_2-C_6)$alkylene independently are unsubstituted or substituted with one or more substituents halides, alkoxy groups (e.g., $(C_1-C_3)$alkoxy), hydroxy, thiol (i.e., —SH), carboxylic ester groups (e.g., —C(O)$OR^2$), ketone groups (e.g., —C(O)$R^6$;), carboxylic acid (i.e., —COOH), amines (e.g., —$NR^3R^4$), and amides (e.g., —C(O)$NR^3R^4$), wherein $R^2$, $R^3$, $R^4$, and $R^6$ are unsubstituted versions of the groups as defined herein for the electrospinning solvents.

In some embodiments, a surfactant, salt, and other material is added to the electrospinning solution to modify one or more of the operating characteristics (e.g., viscosity, conductivity (or resistivity), and surface tension) of the solution. These additives include, but are not limited to, sodium dodecyl sulfate, pyridinium formate, inorganic salt, poly(ethylene glycol), triethyl benzyl ammonium chloride, poly(propylene oxide)- and poly(ethylene oxide)- ethers, nanoclay (laponite) and combinations thereof.

Producing Activated Fibers by Melt Electrospinning

In a typical melt electrospinning process for producing activated fibers, the melt of the activated polymer composition is fed into or onto the spinneret from, for example, the syringe at a constant and controlled rate using a metering pump. A high voltage (e.g., 1 kV to 120 kV) is applied and the drop of composition at the nozzle of the syringe becomes highly electrified. At a characteristic voltage the droplet forms a Taylor cone, and a fine jet of activated polymer composition develops. The fine jet is drawn to the conductor (e.g., a grounded conductor), which is placed opposite the spinneret. While being drawn to the conductor, the jet cools and hardens into activated fibers. Preferably, the activated fibers are deposited on a collector that is placed in front of the conductor. In some embodiments, the activated fibers are deposited on the collector as a randomly oriented, nonwoven mat or individually captured and wound-up on a roll. The activated fibers are subsequently stripped from the collector if desired. In other embodiments, a charged conductor (opposite polarity to that of electrode) is employed instead of the grounded conductor.

The parameters for operating the electrospinning apparatus for effective melt spinning of the activated polymer composition are readily determined by a person of ordinary skill in the art without undue experimentation. By way of example, the spinneret is generally heated up to about 300° C., the spin electrode temperature is maintained at about 10° C. or higher (e.g., up to just below a decomposition temperature of the composition or up to about 150° C. higher) above the melting point or temperature at which the activated polymer composition has sufficiently low viscosity to allow thin fiber formation, and the surrounding environmental temperature is unregulated or, optionally, heated (e.g., maintained at about similar temperatures using hot air).

Alternatively, the spinneret is generally heated up to about 300° C. and the surrounding environmental temperature optionally is maintained at about room temperature (i.e., from about 20° C. to 30° C.). The applied voltage is generally about 1 kV to 120 kV, preferably 1 kV to 80 kV. The electrode gap (the gap between spin electrode and collector) is generally between about 3 cm and about 50 cm, preferably about 3 cm and about 19 cm. Preferably, the activated fibers are fabricated at about ambient pressure (e.g., 1.0 atmosphere) although the pressure may be higher or lower.

Preferred electrospinning devices are those that are marketed commercially as being useful for melt electrospinning. Use of commercially available melt electrospinning device such as NS Lab M device, Elmarco s.r.o., Liberec, Czech Republic (e.g., using Nanospider™ technology), are more preferred.

The activated fibers that are prepared by a melt electrospinning process described herein generally have an average diameter of about 1000 nm or less, more preferably about 800 nm or less, and more preferably about 600 nm or less. Preferably, the average diameter is at least 100 nm, more preferably at least 200 nm. In other aspects, the average diameter is from about 30 nm to about 1000 nm, more preferably about 200 nm to about 600 nm. In other aspects, the average diameter is from about 50 nm to about 1000 nm. In some embodiments, activated fibers are fabricated with diameters as low as about 30 nm. Particularly preferred are activated fibers with average diameters of about 200 nm to 300 nm.

A melt electrospinning process described above produces the activated fibers without beading.

Producing Activated Fibers by Melt Blowing

A melt blowing device typically comprises at least one die block having a portion that functions as a die tip; at least one gas knife assembly; a source of a stretch gas stream; and a collector, wherein the source of a stretch gas stream independently is in operative fluid communication with the gas knife assembly and the die tip. The die tip defines at least one, preferably a plurality of, apertures through which a melt of a material to be melt blown (i.e., MSA material or activated polymer composition) passes. A source of the melt is in operative fluid communication with the apertures of the die tip. Examples of useful stretch gases are air, nitrogen, argon, helium, and a mixture of any two or more thereof. Preferably, the stretch gas is air, nitrogen, or a mixture thereof; more preferably the stretch gas is air. An example of a melt blowing device is an Oerlikon Neumag Meltblown Technology™ system (Oerlikon Heberlein Wattwil AG, Switzerland).

The invention herein may use any melt blowing system but preferably uses specialized process melt-blowing systems produced by Hills, Inc. of West Melbourne, Fla. 32904. See e.g. U.S. Pat. No. 6,833,104 B2, and WO 2007/121458 A2 the teachings of each of which are hereby incorporated by reference. See also www.hillsinc.net/technology.shtml and www.hillsinc.net/nanomeltblownfabric.shtml and the article "Potential of Polymeric Nanofibers for Nonwovens and Medical Applications" by Dr John Hagewood, J. Hagewood, LLC, and Ben Shuler, Hills, Inc, published in the 26 Feb. 2008 Volume of Fiberjournal.com. Preferred dies have very large Length/Diameter flow channel ratios (L/D) in the range of greater than 20/1 to 1000/1, preferably greater than 100/1 to 1000/1, including for example, but not limited to, L/D values 150/1, 200/1, 250/1, 300/1 and the like so long as there is sufficient polymer back pressure for even polymer flow distribution. Additionally, the die spinholes ("holes") are typically on the order of 0.05 to 0.2 mm in diameter.

In an alternative process, the solution electrospinning, melt electrospinning, or melt blowing process for producing activated fibers described above is repeated except a MSA material is used instead of the activated polymer composition to produce MSA fibers, which are then contacted with one or more active agents useful in the present invention to give the activated fibers wherein the one or more active agents are in coating operative contact with the MSA fibers.

The Highly Filled Polymer Filler Composite

A preferred highly filled polymer filler composite is characterized, when a melt, as having a zero shear viscosity of less than 10,000 Pa·s. at from above $T_m$ up to about 40° C. above $T_m$. The viscosity of a melt of one of the preferred highly filled polymer filler composites is less than 90 Pa·s. at 180° C., and more preferably in the range of from 1 Pa·s. to 100 Pa·s. at 150° C. to 170° C.

Another preferred highly filled polymer filler composite is characterized as having a storage modulus (G') compared to G' of the MSA material alone (i.e., unfilled), of 2 times or higher, more preferably 3 times or higher, and still more preferably 6 times or higher. In some embodiments, G' of the highly filled polymer filler composite at room temperature (i.e., 25° C.) is 200 megaPascals (MPa) or higher than G' of the MSA material alone. In other embodiments, G' of the highly filled polymer filler composite is 400 MPa or higher, more preferably 600 MPa or higher, and still more preferably 700 MPa or higher. Storage modulus G' is measured by dynamic mechanical spectroscopy (DMS) according to the method described later.

Materials and Methods

Compounding Procedures for Preparing Filled MSA Compositions and Composites

Prior to compounding, all MSA materials and filler materials are pre-weighed and stored separately.

Compounding Procedure 1: any filler (e.g., talc). A Haake PolyLab Rheocord blender (Haake) is outfitted with a 20 milliliter (mL) bowl. Temperatures of all zones of the Haake mixer are set to 160° C. An air cooling hose is attached to the central one of the zones in order to maintain temperature control. The MSA material is loaded into the 20 μL bowl and allowed to melt. Filler material is added directly to the MSA material melt. Then, a plunger is lowered into the Haake, and the melt of the MSA material and filler is compounded at a rotor speed of 200 revolutions per minute (rpm), and a residence time of approximately 2.5 minutes. The residence time begins with the lowering of the plunger, and ends with the raising a stopper. Table A presents the timing for the talc compounding.

TABLE A

Summary of talc composite compounding procedure

| Time | rpm | Comment |
|---|---|---|
| 0 second | 200 | |
| 10 seconds | 50 | Add MSA material |
| 1 minute 10 seconds | 200 | Allow MSA material to melt |
| 1 minute 30 seconds | 200 | Add filler (e.g., talc) |
| 2 minutes 30 seconds | 200 | Compound to give filler composite |
| 5 minutes | 0 | Recover filler composite |

Compounding Procedure 2: preferred for when filler is silica. The Haake is fitted with a 60 μL bowl and run at 170° C. and 50 rpm. The MSA material is added to the Haake bowl first and allowed to melt. Then the silica is added and blended into the MSA material for 10 minutes after all the silica is added. The resulting composites are removed from the Haake and pressed into flat pieces while still warm. After cooling at room temperature, the pressed composite material is cut into pieces for compression molding.

Compression Molding:

Prior to molding, all samples are allowed to dry overnight (at least 16 hours) at 65° C. in a vacuum of approximately 36 cmHg (48 kiloPascals (kPa)). Samples are compression molded into 10 cm×10 cm×0.05 cm plaques and 5 cm×1.25 cm×0.32 cm bars unless otherwise noted. Compression molding is done using a MPT-14 compression/lamination press (Tetrahedron Associates, Inc., San Diego, Calif., USA) having a molder and mold chase.

Compression Molding Procedure 1 (used for composites of Comparative Example(s) below):

| | |
|---|---|
| Procedure 1: | 170° C./4 minutes/1000 pounds per square inch (psi) (7000 kiloPascals (kPa)) |
| | 170° C./1 minutes/35000 psi (240,000 kPa) |
| | Cool/3:30 minutes/35000 psi (240,000 kPa) |
| Repack: | 170° C./5 minutes/1000 psi (7000 kPa) |
| | 170° C./2 minutes/40000 psi (300,000 kPa) |
| | 170° C./2 minutes/1000 psi (7000 kPa) |
| | 170° C./2 minutes/40000 psi (300,000 kPa) |
| | Cool/5 minutes/40000 psi (300,000 kPa) |

Compression Molding Procedure 2 (used for composites of Examples 5A to 5F of the Present Invention below) are summarized in Table B:

TABLE B

Summary of compression molding parameters for composites Examples 5A to 5F

| Step | Temperature (° C.) | Temperature ramp rate (° C./minute) | Load, kg (klb) | Load ramp rate, kg/minute (klb/min) | Time (minutes) |
|---|---|---|---|---|---|
| 1 | 140 | 93 | 608 (1.5) | 317 × 10³ (1200) | 5 |
| 2 | 140 | 93 | 4536 (10) | 317 × 10³ (1200) | 4 |
| 3 | 140 | 93 | 18143 (40) | 317 × 10³ (1200) | 3 |
| 4 | 37.8 | 93 | 450 (1) | 317 × 10³ (1200) | 5 |
| 5 | End | | | | |

Compression Molding Procedure 3 (used for composite of Example 6 of the Present Invention below):

Samples containing silica are compression molded into 5 cm by 5 cm by 0.3 cm plaques at 90° C. and 5000 psi. Cool composites under pressure in molder to room temperature or less to allow clean removal of the plaques from the mold chase.

Testing:
  Ultimate Tensile: procedure of ASTM D-638
  Flexural modulus: procedure of ASTM D-790

Imaging:
  Transmission electron microscope (TEM) imaging: Samples, approximately 0.5 mm in thickness, from the compression molded plaques and mounted in a chuck for ultracryomicrotomy. Cross-sectional to the thickness, the samples are trimmed into a trapezoid and cooled to −100° C. in the microtome. Thin-sections, approximately 80 nm are obtained with a Leica UC6:FC6 cryo-microtome and examined in a JEOL 1230 operating at an accelerating voltage of 120 kilovolts (kV). Digital TEM images of the microstructure are recorded at various magnifications (typically 1,000 times; 10,000 times; and 50,000 times magnification) using a Gatan Multiscan CCD camera.

Thermogravimetric Analysis (TGA) Procedure
  Samples weighing between 5 milligrams (mg) and 10 mg are loaded into an aluminum TGA pan and heated to 500° C. at a rate of 10° C./minute in a TA Instruments Q5000 TGA in a nitrogen gas atmosphere. TGA is used to determine actual concentration of inorganics in a composite.

Dynamic Mechanical Spectroscopy (DMS) Procedure
  Prior to conducting DMS experiments, all samples are exposed to laboratory atmosphere for at least 40 hours to allow for sample equilibration to the test environment. Samples are in the form of the 5 cm×1.25 cm×0.32 cm compression molded bars, which are loaded into torsional rectangular holders of an Ares Rheometer from TA Instruments. Initially, a dynamic strain sweep is conducted at 1 Hz and 25° C. beginning at a strain of 0.001%. For each sample a strain value is obtained from a region where storage modulus (G') is linear over a range of strain values. This strain value is used for subsequent dynamic frequency sweeps and dynamic temperature ramps. Using the strain value obtained during the strain sweep, a frequency sweep is conducted at 25° C. The frequency ranged from 100 radians per second (rad/s.) to 0.01 rad/s. Finally, a temperature ramp is conducted from −80° C. to 100° C. at a heating rate of 5° C./minute. The frequency is held constant at 1 Hz.

Melt Viscosity Measurement Procedure
  Samples are die cut from a plaque of composite. Parallel plate geometry holders in an Ares Rheometer (TA Instruments) are heated to 170° C. The holders are zeroed at temperature. A sample is loaded onto the holders, and the top holder is lowered into that sample so that there is significant normal force on the sample. The sample is allowed to melt, and any melted sample that extends beyond the holders is removed. Initially, a dynamic strain sweep is conducted at 1 Hz and 170° C. beginning at a strain of 0.1%. For each sample, a strain value is obtained from a region where dynamic loss shear modulus (G") is linear over a range of strain values. This strain value is used for subsequent dynamic frequency sweeps. Using the strain value obtained during the strain sweep, a frequency sweep is conducted at 170° C. The frequency ranged from 100 rad/s. to 0.1 rad/s.

Determining Copolymer Number Average Molecular Weight ($M_n$)

Proton nuclear magnetic resonance spectroscopy (proton NMR or $^1$H-NMR) is used to determine monomer purity, copolymer composition, and copolymer number average molecular weight $M_n$ utilizing the $CH_2OH$ end groups. Proton NMR assignments are dependent on the specific structure being analyzed as well as the solvent, concentration, and temperatures utilized for measurement. For ester amide monomers and co-polyesteramides, d4-acetic acid is a convenient solvent and is the solvent used unless otherwise noted. For ester amide monomers of the type called DD that are methyl esters typical peak assignments are about 3.6 to 3.7 ppm for $C(=O)—OCH_3$; about 3.2 to 3.3 ppm for $N—CH_2—$; about 2.2 to 2.4 ppm for $C(=O)—CH_2—$; and about 1.2 to 1.7 ppm for $C—CH_2—C$. For co-polyesteramides that are based on DD with 1,4-butanediol, typical peak assignments are about 4.1 to 4.2 ppm for $C(=O)—OCH_2—$; about 3.2 to 3.4 ppm for $N—CH_2—$; about 2.2 to 2.5 ppm for $C(=O)—CH_2—$; about 1.2 to 1.8 ppm for $C—CH_2—C$, and about 3.6 to 3.75 $—CH_2OH$ end groups.

PREPARATIONS

Preparation 1

Preparation of MSA Material that is a Polyesteramide (PEA) Comprising 50 Mole Percent of Ethylene-N,N'-dihydroxyhexanamide (C2C) Monomer (the MSA Material is Generally Designated as a PEA-C2C50%)

Step (a) Preparation of the Diamide Diol, Ethylene-N,N'-dihydroxyhexanamide (C2C)

A 10-liter (L) stainless steel reactor equipped with an agitator and a cooling water jacket is charged with ε-caprolactone (5.707 kilograms (kg), 50 moles) and purged with nitrogen. Under rapid stirring, ethylene diamine (EDA; 1.502 kg, 25 moles) is added at once. After an induction period a slow exothermic reaction starts. The reactor temperature gradually rises to 90° C. under maximum cooling applied. A white deposit forms and the reactor contents solidify, at which point stirring is stopped. The reactor contents are then cooled to 20° C. and are then allowed to rest for 15 hours. The reactor contents are then heated to 140° C. (at which temperature the solidified reactor contents melt), and heated then further to 160° C. under continued stirring for at least 2 hours. The resulting liquid product is then discharged from the reactor into a collecting tray. A nuclear magnetic resonance study of the resulting product shows that the molar concentration of C2C in the product exceeds 80 percent. The procedure is repeated four more times resulting in five product lots. The melting point of the product is determined to be 130-140° C. (main melting point) by differential scanning calorimetry (DSC) (peak maximum). The solid material is granulated and used without further purification.

Step (b): preparation of a MSA copolyesteramide with 50 mole percent amide content (PEA-C2C50%)

Loading a Reactor

A 100 L single-shaft Kneader-Devolatizer reactor equipped with a distillation column and a powerful vacuum pump system is nitrogen purged and heated to 80° C. (thermostat oil). Dimethyl adipate (DMA), 38.324 kilograms (kg) and granulated C2C monomer (31.724 kg, prepared as described above in Step (a)) are fed into the kneader. The slurry is stirred at 50 revolutions per minute (rpm). 1,4-butane diol (1,4-BD; 18.436 kg) is added to the slurry at a temperature of about 60° C. The reactor temperature is further increased to 145° C. to obtain a homogeneous solution.

Step (c): Distilling Methanol and Transesterification

Still under nitrogen atmosphere, titanium(IV) tetrabutoxide catalyst, 153 grams (g) in 1.380 kg 1,4-BD is injected at a temperature of 145° C. in the reactor; methanol evolution starts. The temperature in reactor is slowly increased to 180° C. in 1.75 hours and is held for 45 additional minutes to complete the methanol distillation at ambient pressure. Methanol (12.664 kg) is collected.

Step (d): Distilling 1,4-butanediol and Polycondensation to Give PEA-C2C50%

The reactor dome temperature is increased to 130° C. and the vacuum system activated stepwise to a reactor pressure of 7 millibars (mbar) in 1 hour. Temperature in the kneader/devolatizer reactor is kept at 180° C. Then the vacuum is increased to 0.7 mbar for 7 hours while the temperature is increased to 190° C. The reactor is kept for 3 additional hours at 191° C. and with vacuum ranging from 0.87 mbar to 0.75 mbar. At this point a sample of the reactor contents is taken (Sample Number 1); melt viscosities are 6575 megaPascals (mPa.) at 180° C. and 5300 mPa. at 190° C. The reaction is continued for another 1.5 hours until a sample (Sample Number 2) shows final melt viscosities are 8400 mPa. at 180° C. and 6575 mPa. at 190° C. Then the liquid Kneader/Devolatizer reactor contents are discharged at high temperature of about 190° C. into collecting trays, the resulting MSA material is cooled to room temperature and grinded. Weight of final product PEA-C2C50% of Preparation 1 is 57.95 kg (87.8% yield). A sample (Sample Number 3) of the PEA-C2C50% of Preparation 1 has melt viscosities of 8625 mPa. at 180° C. and 6725 mPa. at 190° C. Viscosities are determined using a Brookfield DV-II+ Vicosimeter with spindle number 28 at 20 revolutions per minute (rpm). Proton NMR determines that Sample Numbers 1 to 3 have $M_n$ of 6450 grams per mole (g/mol); 6900 g/mol; and 7200 g/mol, respectively.

Preparation 2

Formation of Nonwoven Webs Comprising MSA Fibers by Melt Blowing

The nonwoven web of Preparation 2 is prepared by melt blowing the MSA material of Sample 3 ($M_n$ 7200 g/mol) of Preparation 1. An Oerlikon Neumag Melt-blown Technology™ (M&J technology) system comprising a die block is used to prepare fibers and nonwoven webs. The die block comprises a beam defining spinholes, the beam having a spinhole density of 55 spinholes per inch (i.e., 22 spinholes per centimeter). As is known in the art, the spinhole density may be higher or lower depending on the particular nonwoven web desired. Each spinhole has a diameter of 0.3 mm and a length-to-depth (L/D) ratio of 10. Length of the beam defines width of the nonwoven web. A 100 mesh screen pack is used in the die block for filtering materials to be melt blown. MSA materials preferably are dried at 80° C. for 2 hours in a ventilating silo/dryer to remove any residual water before being melt blown. The MSA material or activated polymer composition of the first embodiment is melt-blown at 170° C. melt temperature and 170° C. stretch gas temperature (preferably, the stretch gas is air sourced from a compressed air chamber and the temperature of the stretch gas is measured in the compressed air chamber). Melt blowing the PEA-C2C50% of Preparation 1 yields a nonwoven web comprising MSA fibers of Preparation 2, the nonwoven web having a basis weight of 25 GSM (grams per meter squared).

Preparation 3

Formation of a Fiber Composite Comprising MSA Fibers Prepared by Melt Electrospinning and Porous Polypropylene Support The fiber composite of Preparation 3 is prepared by melt electrospinning the MSA material of Sample 3 of Preparation 2 utilizing a NS Lab-M device manufactured by Elmarco s.r.o., Liberec, Czech Republic. A voltage of 100 kV is applied across 20 cm distance. The polymer melt temperature is 190° C. and the rotating electrode (20 rpm) is heated by applying 150 volts across it.

The generated fibers are deposited on a spunbonded porous polypropylene support to give the fiber composite of Preparation 3. The porous polypropylene support has a basis weight of about 20 GSM and travels at a speed of about 1 meter per minute.

Pore size distribution of the fiber composite of Preparation 3 is characterized by the method of capillary flow porometry ASTM E-1294-89 (1999), where 99.5% of the pores of the fiber composite of Preparation 3 have mean flow pore sizes within ±0.05 μm of a mode pore size of 3.19 μm. The mode pore size of 3.19 μm contains 85.9% of the pores.

Preparation 4

Preparation of MSA Material that is a Polyesteramide (PEA) Comprising 6.9 Mole Percent of Ethylene-N,N'-dihydroxyhexanamide (C2C) Monomer (the MSA Material is Generally Designated as a PEA-C2C6.9%)

In a nitrogen atmosphere, load titanium (IV) butoxide (0.58 g, 1.7 mmol), recrystallized N,N'-1,2-ethanediylbis(6-hydroxyhexanamide) (C2C) (22.63 g, 78.47 mmol), dimethyl adipate (195.27 g, 1.1210 mol), and 1,4-butanediol (144.46 g, 1.603 mol) into a 500 mL roundbottom flask. Into the flask insert a stir-shaft and blade, Claisen style distillation head with Vigreux column, and stir-bearing, and attach a collection receiver. Degas the resulting apparatus with three vacuum/nitrogen gas cycles before leaving under nitrogen. Heat-trace distillation head and immerse flask into 160° C. bath, and raise bath setpoint to 175° C. with a total of 2 hours from 160° C. to 175° C. Over a period of about 2.25 hours, lower pressure stepwise and hold pressure at 10 Torr. Keep apparatus under full vacuum (about 0.4 Torr to 0.6 Torr) for a total of about 5 hours. Increase the bath temperature after about 2 hours to 190° C., and subsequently increase after about 2 hours to 210° C. Hold bath temperature at 210° C. for about 1 hour. Collect the resulting PEA-C2C6.9% product. PEA-C2C6.9% has inherent viscosity=0.229 dL/g (0.5 g/dL, 30.0° C., chloroform/methanol (1/1, w/w)). By DSC, $T_m$=65° C. (60 J/g). By proton NMR, $M_n$ is 7900 grams per mole and C2C content is 6.9 mol %.

COMPARATIVE (NON-INVENTION) EXAMPLE(S)

Comparative Example 1

Unfilled PEA-C2C50% of Preparation 1

Separate samples of the PEA-C2C50% of Preparation 1 are compression molded, prepared as plaques, or prepared as flat sheets, and subjected to TGA, DMS, and melt viscosity measurements according to the procedures described previously. TGA results are shown as parts of FIG. 9. DMS results are shown as part of FIG. 10. The TGA and DMS results are discussed later.

Melt viscosity results are shown as parts of FIGS. 11 and 12. In the figures, the unfilled PEA-C2C50% of Preparation 1 is referred to as "C2C-50," "C2C-50 (unfilled)," or "unfilled PEA-C2C50%."

EXAMPLES OF THE PRESENT INVENTION

In all case for the Examples 1 to 5 below, specimens of nonwoven webs comprising MSA fibers are prepared by cutting the nonwoven web comprising the MSA fibers of Preparation 2 into 50 square-centimeter ($cm^2$) circles using a die and clicker press. The weight of each specimen is recorded.

Example 1

Silver Acetate Treated Nonwoven Web Comprising MSA Fibers

A stock 1 wt % silver acetate solution (50 grams (g)) is prepared using deionized water (49.5 g) and silver acetate (0.5 g; Alfa Aesar stock #11660). To speed up dissolution, the silver acetate solution is heated to 65° C. for 15 minutes and allowed to cool to room temperature.

The solution is then poured into a 100 millimeter (mm)×20 mm Petri culture dish (from VWR catalogue #8900-324). Individual specimens of the nonwoven web comprising the MSA fibers of Preparation 2 are submerged in the solution for 2 minutes, removed, allowed to drip for 30 seconds, and then laid flat on an oven rack. When the rack is full, it is placed in an oven at 65° C. for 4 hours to dry to a constant weight. The specimen weight is recorded again to determine the weight gain. The procedure is repeated five more times and the results for the three runs (1 to 6) are shown below in Table 1.

Example 2

Chelated Silver Acetate-Treated Nonwoven Web Comprising MSA Fibers

A stock of a 1 wt % silver acetate and 2.5 wt % of ethylenediaminetetracetic acid disodium salt (VERSENE™ $Na_2$, The Dow Chemical Company) solution (50 g) is prepared from silver acetate (0.5 g), VERSENE™ $Na_2$ (1.25 g), and deionized water (48.25 g). To speed up dissolving, the solution is heated to 65° C. for 15 minutes and allowed to cool to room temperature. Three specimens of the nonwoven web comprising the MSA fibers of Preparation 2 are separately treated with the solution in a manner analogous to that described above for Example 1, and the results for the three runs (7 to 9) are also shown below in Table 1.

Example 3

In Situ Silver Chloride-Treated Nonwoven Web Comprising MSA Fibers

In a first container, a stock 1 wt % silver acetate solution (50 grams (g)) is prepared as described above in Example 1. In a second container, 300 grams of a 0.9 wt % NaCl solution is prepared using deionized water (297.3 g) and sodium chloride (2.7 g; reagent grade; ≧99% purity). The 1 wt % silver acetate solution is then poured into a 100 millimeter (mm)×20 mm Petri culture dish. 30 grams of the 0.9 wt % NaCl solution is poured into a second 100 millimeter (mm)×20 mm Petri culture dish. Three specimens of the nonwoven web comprising the MSA fibers of Preparation 2 are separately first submerged in the 1 wt % silver acetate solution for 1 minute, removed, and then placed in the 0.9 wt % NaCl solution for 30 seconds. The specimens are then removed from the 0.9 wt % NaCl solution, allowed to drip for 30 seconds, then laid flat on an oven rack. When the rack is full, it is placed in an oven at 65° C. for 4 hours to dry as described in Example 1. The treated specimen weights from the three runs (10 to 12) are recorded again to determine the weight gain, and the results for the three runs (10 to 12) are also shown below in Table 1.

TABLE 1

| Run Number | Wt. (g) untreated MSA fiber | Wt. (g) treated MSA fiber | Weight of treated MSA fiber minus untreated MSA fiber (g) | Percent of Weight Increase (%) |
|---|---|---|---|---|
| 1 | 0.1147 | 0.1251 | 0.0104 | 9.1 |
| 2 | 0.1175 | 0.1253 | 0.0078 | 6.6 |
| 3 | 0.116 | 0.1232 | 0.0072 | 6.2 |
| 4 | 0.1148 | 0.1245 | 0.0097 | 8.5 |
| 5 | 0.110 | 0.1184 | 0.0084 | 7.6 |
| 6 | 0.1127 | 0.122 | 0.0093 | 8.3 |
| 7 | 0.1213 | 0.1553 | 0.034 | 28.0 |
| 8 | 0.1172 | 0.1453 | 0.0281 | 24.0 |
| 9 | 0.1317 | 0.178 | 0.0463 | 35.2 |
| 10 | 0.1337 | 0.145 | 0.0113 | 8.5 |
| 11 | 0.1323 | 0.1421 | 0.0098 | 7.4 |
| 12 | 0.1343 | 0.1455 | 0.0112 | 8.3 |

The results in Table 1 show that each specimen of the silver salt-treated nonwoven web comprising the MSA fibers of Preparation 2 contains silver salt (i.e., silver acetate for Runs 1-6, chelated silver acetate for runs 7-9, and in situ silver chloride for runs 10-12).

Example 4

Figure 2:
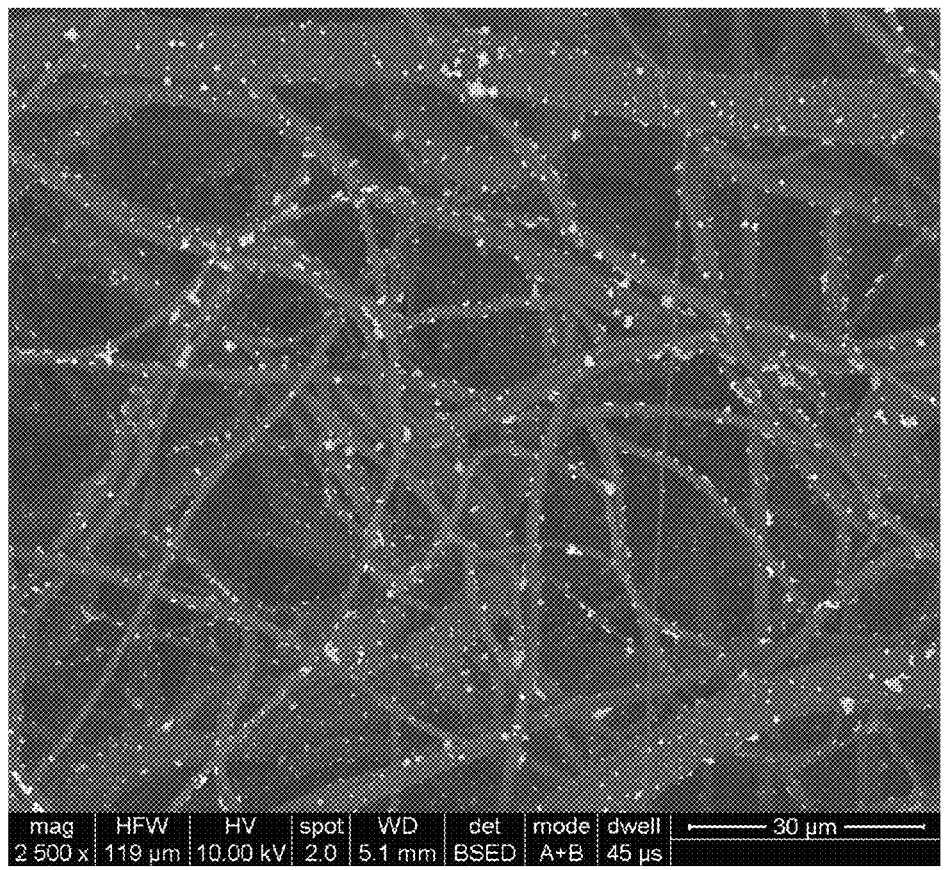
FIG. 2 is a scanning electron microscope (SEM) image of the in situ silver chloride-treated nonwoven web comprising MSA fibers of Example 3 at 2500× magnification.
Figure 3:
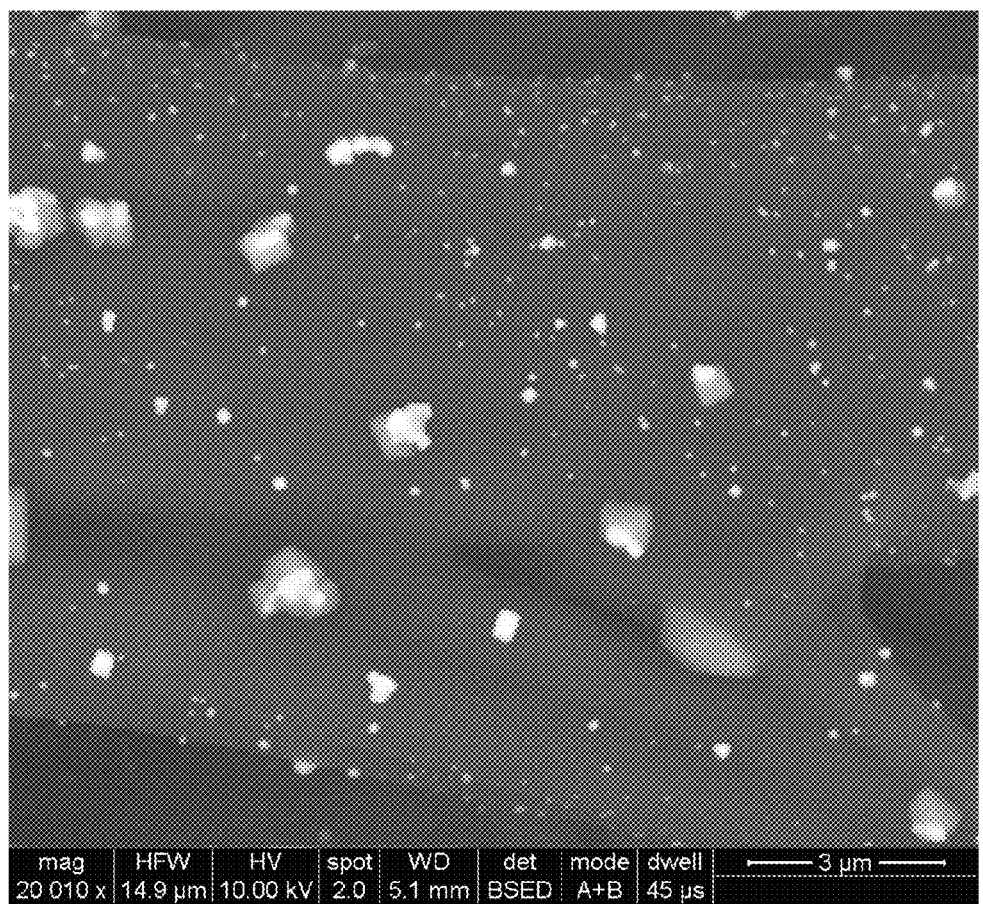
FIG. 3 is a scanning electron microscope (SEM) image of the in situ silver chloride-treated nonwoven web comprising MSA fibers of Example 3 at 20,010× magnification.

SEM Imaging of In Situ Silver Chloride-Treated Nonwoven Web Comprising MSA Fibers The in situ silver chloride-treated nonwoven web comprising MSA fibers of Example 3 are studied at different magnifications (500×, 2500×, and 20,010×) using SEM, and the images are shown in FIGS. 1 to 3, respectively. FIGS. 1 to 3 showed fiber surfaces coated with evenly distributed silver chloride crystals in the forms of particles or agglomerates of a few micrometers size to single particles of a few hundred nanometers size.

Example 5A to 5F

Composites of talc and PEA-C2C50% of Preparation 1

Following Compounding Procedure 1, Haake blending of separate weighed samples of the PEA-C2C50% of Preparation 1 and weighed amounts of the Jetfil 625C talc are separately carried out as described previously to give talc composites having 5 wt %, 10 wt %, 20 wt %, 30 wt %, 40 wt %, or 50 wt % of the Jetfil 625C talc as shown in Table 6.

TABLE 6

| talc composites of Examples 5A to 5F: | | | | | | |
|---|---|---|---|---|---|---|
| | Example Number: | | | | | |
| | 5A | 5B | 5C | 5D | 5E | 5F |
| Amount of Jetfil 625C talc (wt %) | 5 | 10 | 20 | 30 | 40 | 50 |

Figure 4:
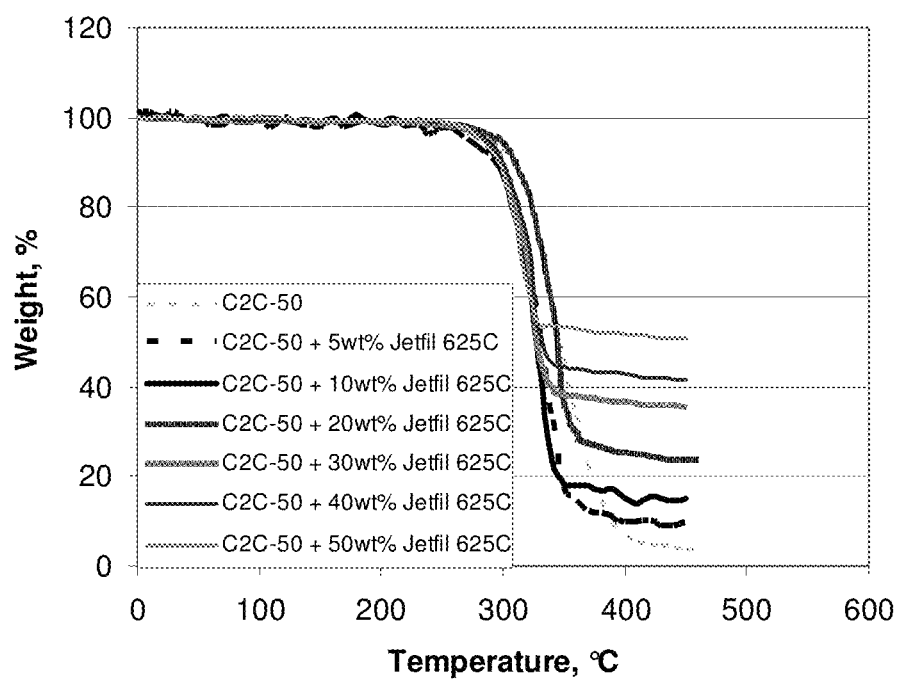
FIG. 4 graphically depicts thermogravimetric analysis (TGA) for the MSA material of Comparative Example 1 and talc composites of Examples 5A to 5F.
Figure 5:
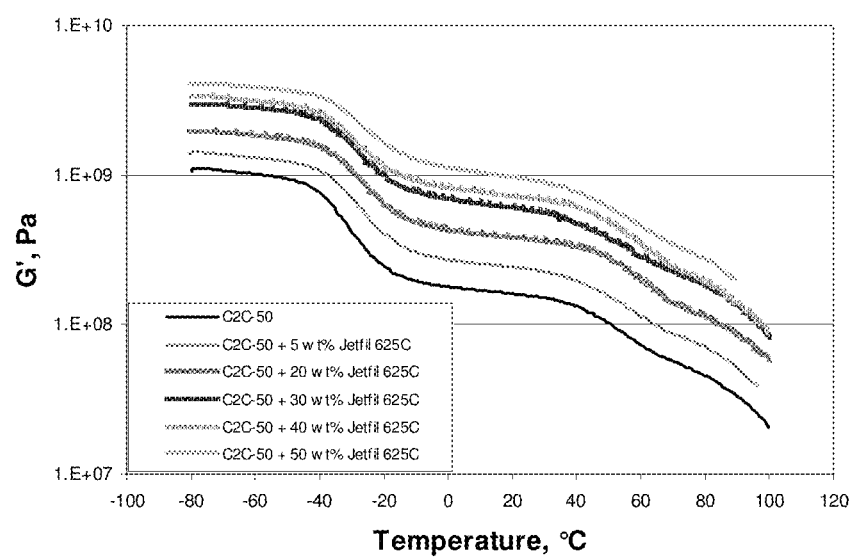
FIG. 5 graphically depicts dynamic mechanical spectroscopy (DMS) results for the MSA material of Comparative Example 2 and the talc composites of Examples 5A and 5C to 5F.
Figure 6:
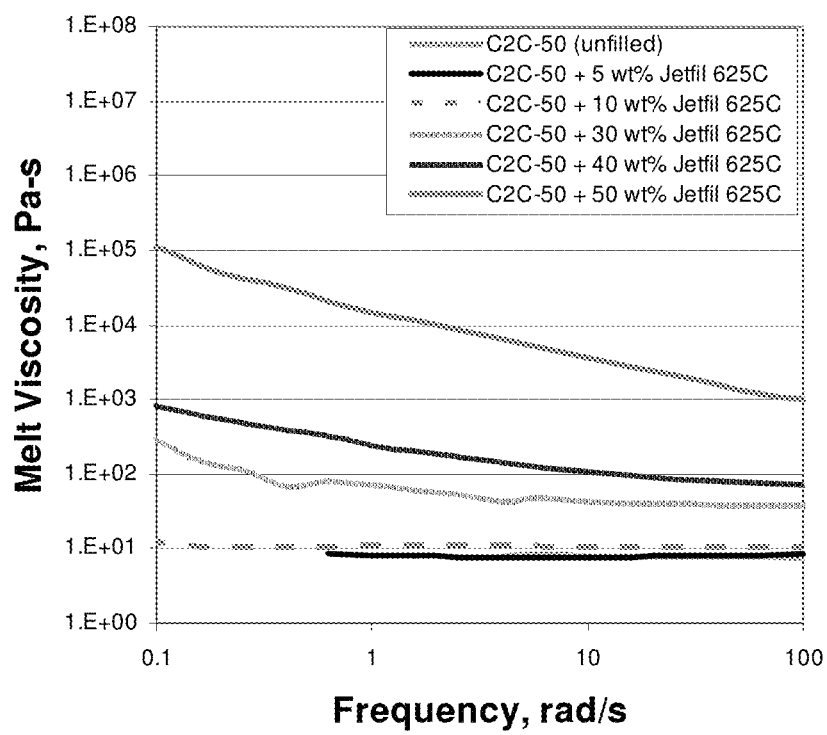
FIG. 6 graphically depicts melt viscosity results for the MSA material of Comparative Example 1 and the talc composites of Examples 5A, 5B, and 5D to 5F.

Separate samples of the talc composites of Examples 5A to 5F are compression molded, prepared as plaques, or prepared as flat sheets, and subjected to TGA, TEM imaging, DMS, and melt viscosity measurements according to the procedures described above. Results are shown in FIGS. 4-6. In FIGS. 4-6, the talc composites of Examples 5A to 5F are referred to by their respective weight percents of Jetfil 625C talc.

TGA results are shown as parts of FIG. 4. The TGA results in FIG. 4 demonstrates that the talc is dispersed in the talc composites of Examples 5A to 5F after compounding. DMS results for the talc composites of Examples 5A and 5C to 5F are shown as parts of FIG. 5. Comparing the DMS results with those of the unfilled PEA-C2C50% of Comparative Example 1 in FIG. 5 demonstrates that storage modulus G' increases with increasing concentration of talc in the talc composites of Examples 5A and 5C to 5F. For these examples, G' increases from about 200 MPa for the unfilled PEA-C2C50% at 20° C. ultimately to about 1000 MPa in the talc composite of Example 5F at 20° C. FIG. 5 also shows that the (dynamic) storage modulus (G') of the talc composites of Examples 5A and 5C to 5F is increased up to six times that of the unfilled PEA-C2C50% of Comparative Example 1.

Melt viscosity results are shown as part of FIG. 6. FIG. 6 shows that the melt dynamic viscosities of the talc composites of Examples 5A, 5B, and 5D to 5F are within the range for processing by conventional melt processing techniques (i.e., materials maintain their processability when highly filled). Even at relatively high talc loadings, such as 40 wt % and 50 wt % talc in FIG. 6, the talc composites of Examples 5A, 5B, and 5D to 5F exhibit melt viscosities at or below 10,000 Pa·S.

Example 6

Composite of Silica and PEA-C2C6.9% of Preparation 1

Figure 7:
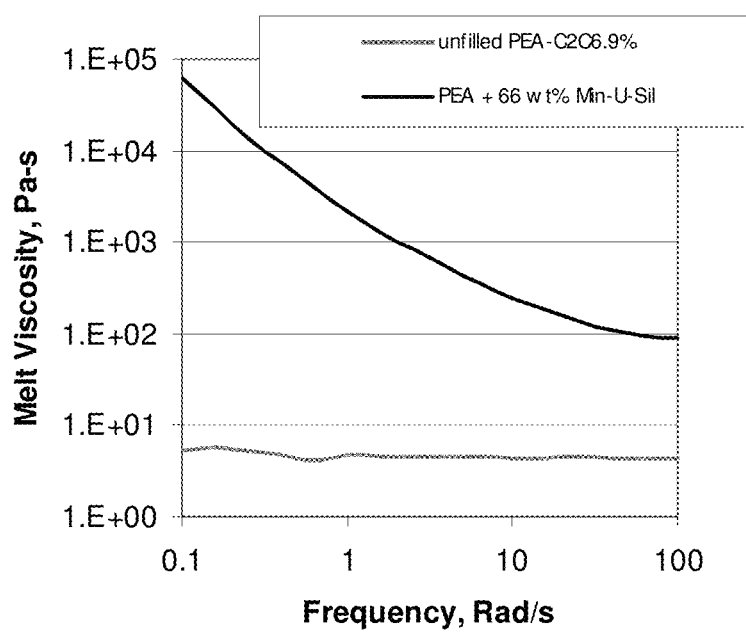
FIG. 7 graphically depicts melt viscosity results for the MSA material of Comparative Example 1 and the silica composite of Example 6.
Figure 8:
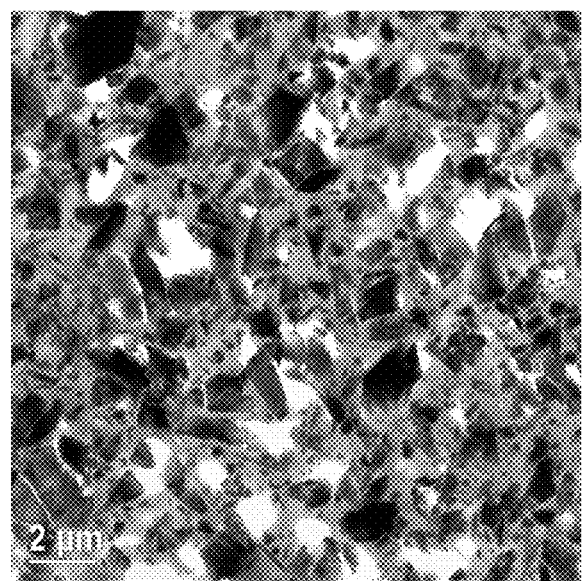
FIG. 8 is a TEM image at 1000 times magnification of the silica composite of Example 6.

Haake blending of 34 wt % PEA-C2C6.9% of Preparation 4 and 66 wt % of the Min-U-Sil™ 5 silica is carried out as described previously to give a silica composite having 66 wt % of the Min-U-Sil™ 5 silica. Melt viscosity results are shown as part of FIG. 7. TEM imaging results are shown in FIG. 8. In FIG. 7, the Min-U-Sil™ 5 silica composite of Example 6 is referred as "PEA+66 wt % Min-U-Sil." FIG. 7 shows that the melt dynamic viscosity if the Min-U-Sil™ 5 silica composite of Example 6 is within an acceptable range for processing by conventional melt processing techniques

What is claimed is:

1. An activated polymer composition comprising a molecularly self-assembling material and one or more active agents, wherein each active agent independently comprises an odor control material, polyelectrolyte, chelating agent, microspheres, non-peptidic antimicrobial substance selected from the group consisting of 10,10'-oxybisphenoxarsine; 2-(normal-octyl)-4-isothiazolin-3-one; 4,5-dichloro-2-(normal-octyl)-4-isothiazolin-3-one; 2,4,4'-trichloro-2'-hydroydiphenyl ether, an anti-clotting compound, a clotting compound, or a wound healing promoter, wherein the molecularly self-assembling material comprises repeat units of formula I:

Formula I
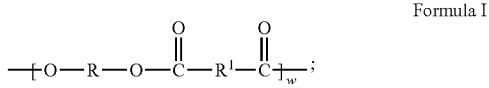

and at least one second repeat unit selected from the ester-amide units of Formula II and III:

Formula II

Formula III
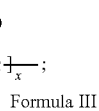

and the ester-urethane units of Formula IV:

Formula IV

wherein:

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 grams per mole to about 5000 grams per mole;

$R^1$ at each occurrence independently is a bond or a $C_1$-$C_{20}$ non-aromatic hydrocarbylene group;

$R^2$ at each occurrence independently is a $C_1$-$C_{20}$ non-aromatic hydrocarbylene group;

$R^N$ is —N($R^3$)—Ra—N($R^3$)—, where $R^3$ at each occurrence independently is H or a $C_1$-$C_6$ alkylene and Ra is a $C_2$-$C_{20}$ non-aromatic hydrocarbylene group, or $R^N$ is a $C_2$-$C_{20}$ heterocycloalkyl group containing the two nitrogen atoms, wherein each nitrogen atom is bonded to a carbonyl group according to formula (III) above;

n is at least 1 and has a mean value less than 2; and w represents the ester mol fraction of Formula I, and x, y and z represent the amide or urethane mole fractions of Formulas II, III, and IV, respectively, where w+x+y+z=1.

2. An activated polymer composition of claim 1, wherein the molecularly self-assembling material comprises self-assembling units comprising multiple hydrogen bonding arrays.

3. An activated polymer composition of claim 1, wherein the number average molecular weight (Mn) of the molecularly self-assembling material is between about 1000 grams per mole (g/mol) and about 50,000 g/mol, inclusive.

4. An activated polymer composition of claim 3, wherein the $M_n$ of the molecularly self-assembling material is less than 5,000 g/mol.

5. An activated polymer composition of claim 1, wherein each active agent independently comprises the odor control material.

6. An activated polymer composition of claim 1, wherein each active agent independently comprises the non-peptidic antimicrobial substance, anti-clotting compound, clotting compound, or wound healing promoter.

7. An activated polymer composition of claim 1, wherein the one or more active agents comprises a total of from 0.0001 weight percent (wt %) to 75 wt % of the activated polymer composition based on total weight of the activated polymer composition.

8. An article comprising the activated polymer composition of claim 1.

* * * * *